United States Patent [19]

Aijala et al.

[11] Patent Number: 5,579,124
[45] Date of Patent: Nov. 26, 1996

[54] METHOD AND APPARATUS FOR ENCODING/DECODING BROADCAST OR RECORDED SEGMENTS AND MONITORING AUDIENCE EXPOSURE THERETO

[75] Inventors: Victor A. Aijala, Arnold; Gerald B. Cohen, Gaithersburg; James M. Jensen, Columbia; Wendell D. Lynch, Silver Spring; Juan C. Urbi, Laurel, all of Md.

[73] Assignee: The Arbitron Company, Columbia, Md.

[21] Appl. No.: 396,342

[22] Filed: Feb. 28, 1995

Related U.S. Application Data

[63] Continuation of Ser. No. 976,558, Nov. 16, 1992, abandoned.

[51] Int. Cl.[6] .............................. H04N 5/76; H04N 5/00
[52] U.S. Cl. ....................... 386/96; 381/2; 386/98
[58] Field of Search ........................... 381/14, 2, 3, 4; 455/2, 49.1, 53, 67; 358/335, 341, 343; 348/1, 2, 3, 5

[56] References Cited

U.S. PATENT DOCUMENTS

| | | | |
|---|---|---|---|
| 2,470,240 | 5/1949 | Crosby | 250/27 |
| 2,573,279 | 10/1951 | Scherbatskoy | 346/27 |
| 2,630,525 | 3/1953 | Tomberlin et al. | 250/6 |
| 2,660,662 | 11/1953 | Scherbatskoy | 250/2 |
| 2,766,374 | 10/1956 | Hoffmann | 250/2 |
| 3,004,104 | 10/1961 | Hembrooke | 179/2 |
| 3,397,402 | 8/1968 | Schneider | 346/37 |
| 3,492,577 | 1/1970 | Reiter et al. | 325/31 |
| 3,760,275 | 9/1973 | Ohsawa et al. | 325/31 |
| 3,803,349 | 4/1974 | Watanabe | 178/5.8 R |
| 3,845,391 | 10/1974 | Crosby | 325/64 |
| 4,025,851 | 5/1977 | Haselwood et al. | 325/31 |
| 4,225,967 | 9/1980 | Miwa et al. | 455/68 |
| 4,230,990 | 10/1980 | Lert, Jr. et al. | 455/67 |
| 4,238,849 | 12/1980 | Gassmann | 370/11 |
| 4,252,995 | 2/1981 | Schmidt et al. | 381/14 |
| 4,425,642 | 1/1984 | Moses et al. | 370/76 |

(List continued on next page.)

FOREIGN PATENT DOCUMENTS

| | | | |
|---|---|---|---|
| 1208761 | 7/1986 | Canada | H04N 7/16 |
| 2036205 | 12/1991 | Canada | H04H 9/00 |
| 2559002 | 8/1985 | France | H04B 1/00 |
| WO91/11062 | 7/1991 | WIPO | H04B 17/00 |

OTHER PUBLICATIONS

The Institute of Electrical and Electronics Engineers, Inc., "Spread Spectrum Techniques", IEEE Press, 1976 (p. 15).
SMPTE Journal, Society of Motion Picture and Television Engineers, Inc., vol. 101, No. 8, Aug. 1992 (pp. 538–549).
Namba, Seiichi, et al., "A Program Identification Code Transmission System Using Low–Frequency Audio Signals"; NHK Laboratories Note; Ser. No. 314, Mar. 85.

*Primary Examiner*—Thai Q. Tran
*Assistant Examiner*—Robert Chevalier
*Attorney, Agent, or Firm*—Curtis, Morris & Safford, P.C.; Eugene L. Flanagan, III

[57] ABSTRACT

Methods and apparatus for encoding and decoding information in broadcast or recorded segment signals are described. In certain embodiments, an audience monitoring system encodes identification information in the audio signal portion of a broadcast or recorded segment using spread spectrum encoding. A personal monitoring device receives an acoustically reproduced version of the broadcast or recorded signal via a microphone, decodes the identification information from the audio signal portion despite significant ambient noise, and stores this information, automatically providing a diary for the audience member which is later uploaded to a centralized facility. A separate monitoring device decodes additional information from the broadcast signal, which is matched with the audience diary information at the central facility. This monitor may simultaneously send data to the centralized facility using a dial-up telephone line, and receive data from the centralized facility through a signal encoded using a spread spectrum technique and modulated with a broadcast signal from a third-party.

110 Claims, 10 Drawing Sheets

U.S. PATENT DOCUMENTS

| | | | |
|---|---|---|---|
| 4,450,531 | 5/1984 | Kenyon et al. | 364/604 |
| 4,547,804 | 10/1985 | Greenberg | 358/142 |
| 4,613,904 | 9/1986 | Lurie | 358/142 |
| 4,618,995 | 10/1986 | Kemp | 455/2 |
| 4,626,904 | 12/1986 | Lurie | 358/84 |
| 4,639,779 | 1/1987 | Greenberg | 358/142 |
| 4,677,466 | 6/1987 | Lert, Jr. et al. | 358/84 |
| 4,697,209 | 9/1987 | Kiewit et al. | 358/84 |
| 4,703,476 | 10/1987 | Howard | 370/76 |
| 4,718,106 | 1/1988 | Weinblatt | 455/2 |
| 4,805,020 | 2/1989 | Greenberg | 358/147 |
| 4,843,562 | 6/1989 | Kenyon et al. | 364/487 |
| 4,876,617 | 10/1989 | Best et al. | 360/60 |
| 4,931,871 | 6/1990 | Kramer | 455/2 |
| 4,943,973 | 7/1990 | Werner | 375/1 |
| 4,945,412 | 7/1990 | Kramer | 358/142 |
| 4,955,070 | 9/1990 | Welsh et al. | 455/2 |
| 4,967,273 | 10/1990 | Greenberg | 358/142 |
| 4,972,471 | 11/1990 | Gross et al. | 380/3 |
| 5,023,929 | 6/1991 | Call | 455/2 |
| 5,113,437 | 5/1992 | Best et al. | 380/3 |
| 5,119,503 | 6/1992 | Mankovitz | 381/6 |
| 5,213,337 | 5/1993 | Sherman | 273/439 |
| 5,319,735 | 6/1994 | Preuss et al. . | |

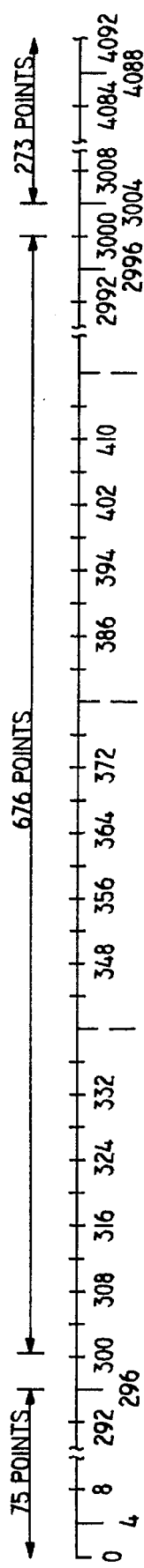
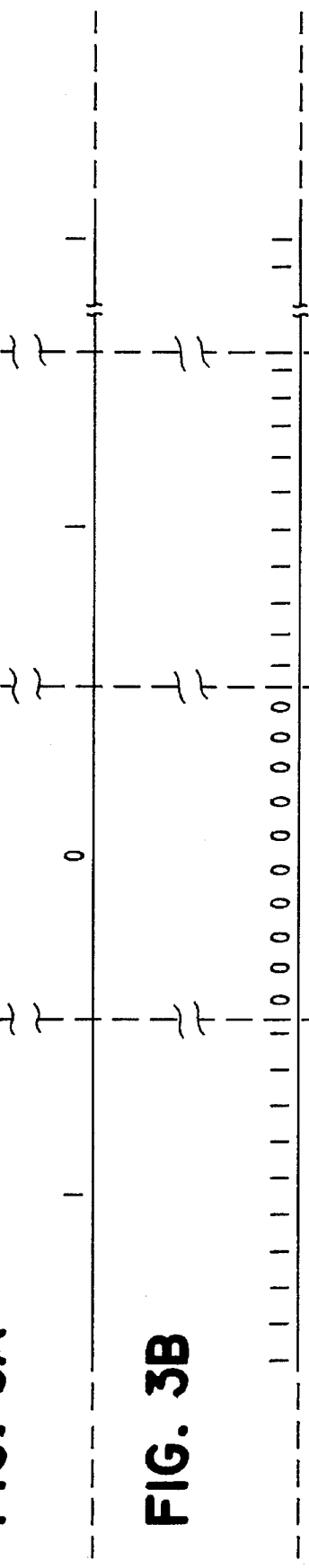
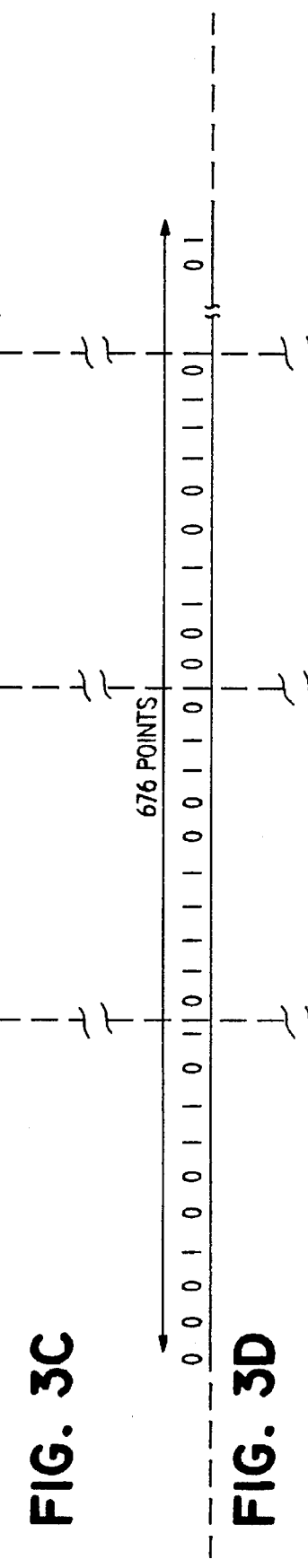
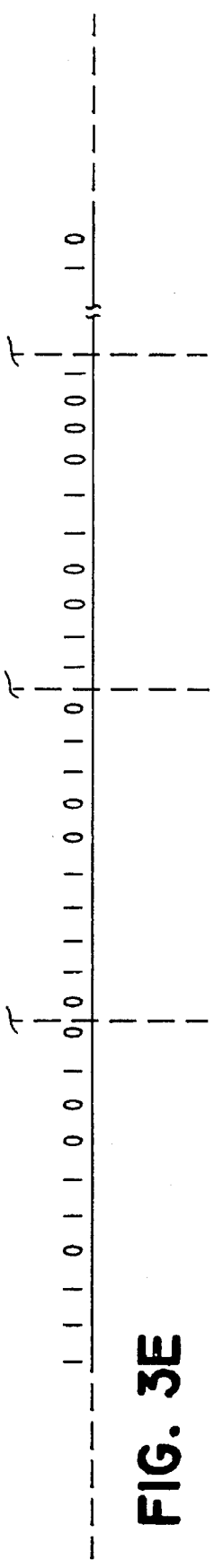
FIG. 3A
FIG. 3B
FIG. 3C
FIG. 3D
FIG. 3E

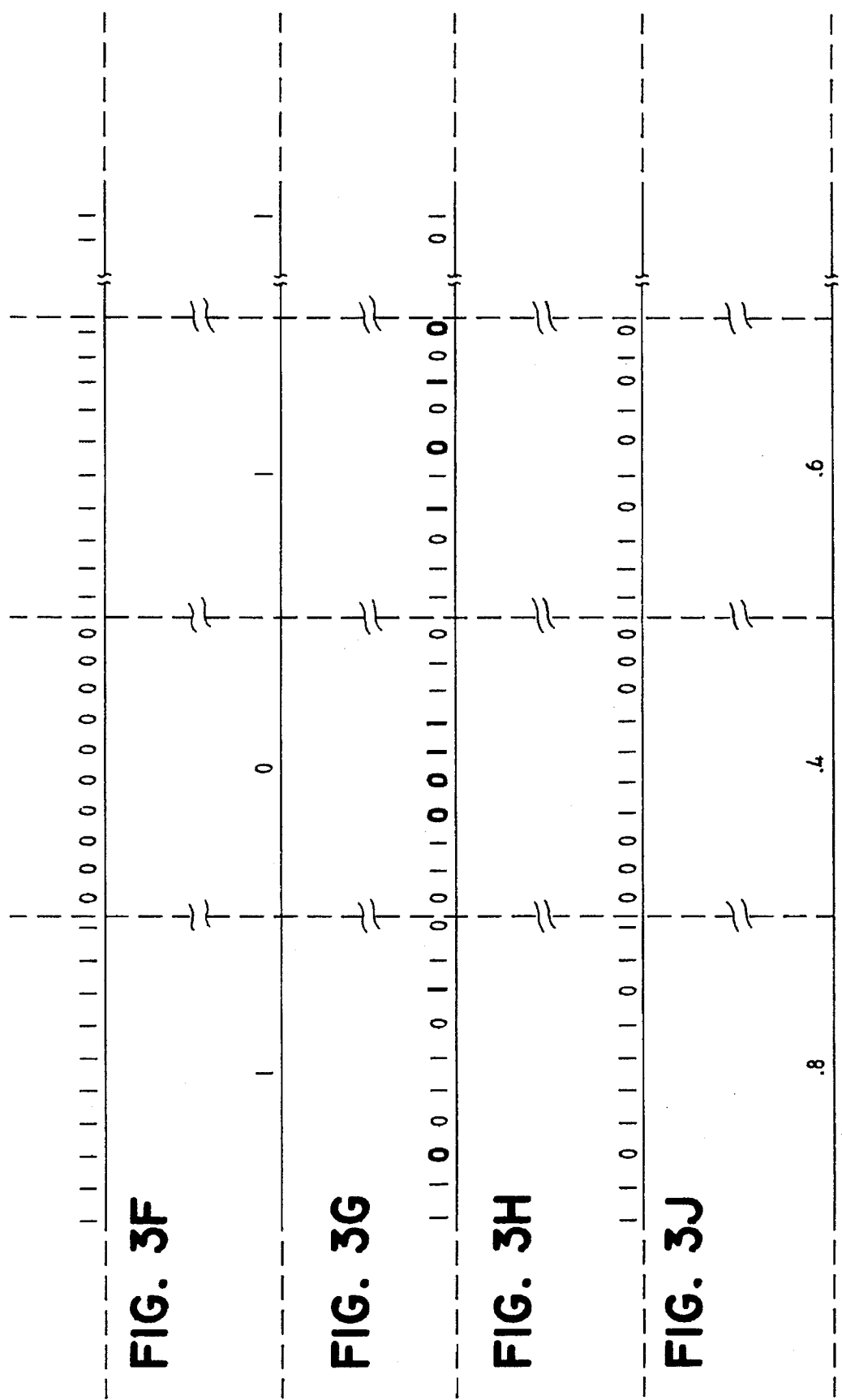

METHOD AND APPARATUS FOR ENCODING/DECODING BROADCAST OR RECORDED SEGMENTS AND MONITORING AUDIENCE EXPOSURE THERETO

This application is a continuation of application Ser. No. 07/976,558, filed Nov. 16, 1992 now abandoned.

BACKGROUND OF THE INVENTION

The present invention relates to encoding and decoding broadcast or recorded segments such as broadcasts transmitted over the air, via cable, satellite or otherwise, and video, music or other works distributed on previously recorded media, as well as monitoring audience exposure to any of the foregoing.

Broadcast segments include live programs, taped programs, commercials and the like. These segments may be aired according to a wide variety of schedules, for example, national coverage, particular geographic coverage or to fill otherwise unreserved programming slots. Furthermore, the scheduled broadcast time may be uniform nationwide or vary according to a broadcaster's local considerations.

There is a need to independently detect when segments, such as commercials, were actually broadcast over a given channel or by a given station.

There is also a need to monitor the audience for broadcast segments because rates charged for broadcast typically depend on audience size. Further, some market research techniques involve testing the effect of broadcast segment frequency and/or nature on consumer purchase decisions.

There are several conventional methods of detecting the identity of broadcast segments. However, each of these methods is limited in at least one respect, such as its complexity, its intrusiveness or inconvenience to audience members, or its vulnerability to errors caused by a noisy environment.

In one such method, each of a number of selected audience members maintains a diary of which programs he or she viewed or heard. This method relies on the voluntary and timely cooperation of the selected audience members. Advertisers, advertising agencies and broadcasters have in the past expressed concerns that media experiences may not have been fully reported by respondents in their diaries. In particular, it has been inferred from survey data that the media experiences of young children, teens and young men are especially underreported. It is thought by some that such groups are either unable to complete the written diaries or find this task to be particularly tedious and thus neglect to enter complete information.

To avoid the perceived drawbacks of manual recording, passive recording methods have been sought. Such passive recording methods would be characterized by the presence of a device which attempts to sense, in real time, the broadcast segments to which an audience member is exposed and record this information, which would later be retrieved at or uploaded to a centralized data processing facility. Since the information would be collected in computer readable form, data processing could be carried out readily with the use of a passive recording apparatus. Information collected by passive recording would be free of human error, and in this respect would enjoy improved reliability.

Devices known as "personal passive people meters", which are small and portable, have been proposed. Such devices are intended to be carried by persons whose broadcast segment exposure would be monitored. These meters would permit viewer/listener determination at the individual level, which is highly desirable.

A major problem in passive recording is to correctly sense the segment to which a viewer is being exposed. The proposed approaches involve attempting to identify both unmodified broadcast segments, and segments modified before broadcast to make them more readily identifiable.

One approach to identification of unmodified segments involves pattern recognition. Each segment is analyzed before or after broadcast and its analyzed characteristics determine its "broadcast signature". A table of broadcast signatures is created by, or made available to, each monitoring station. In operation, a monitoring station attempts to analyze the characteristics of a segment being broadcast and match it to one of the broadcast signatures, that is, recognize its pattern. This approach uses relatively complicated technology and is cumbersome to implement due to the need to enable each monitoring station to recognize new segments as they are introduced.

Several identification approaches involve modifying the broadcast segments to provide a code which the detecting equipment is designed to recognize. An advantage of these approaches is that the monitoring stations need not be updated as new broadcast segments are created.

U.S. Pat. No. 3,004,104 (Hembrooke) proposed to suppress a narrow band of frequencies (10 Hz wide) in a portion of the voiceband (1000 Hz) at timed intervals according to a predetermined code. However, if the suppression is short enough to be imperceptible as information to an audience member, then the suppression may be susceptible to interference from ambient noise sources.

It has also been proposed to modulate the audio frequency subcarrier with an identifying code of narrow bandwidth (100 Hz) and short duration (3 seconds) at the start and end of each segment. This technique is unsatisfactory because the metering equipment for a viewer or listener who tunes in a moment too late and tunes out a moment too early fails to sense the identifying code, and because it is vulnerable to noise.

It has been proposed in the alternative to mix subaudible-frequency identifying codes with conventional audio in the program segments. This technique assumes the monitoring station would receive the broadcast, prior to audible reproduction by the reception equipment, since some reception equipment is of poor quality and might not reproduce this information with sufficient fidelity for a personal metering device to recognize it. Thus, this technique is unsuitable for a personal meter of the type which monitors acoustic signals.

A technique proposed for use with a musical recording comprises eliminating a sequence of six frequency bands from an audio signal, with the sequence varying during the course of the signal, and in place of the eliminated frequencies, inserting a sequence of code signals. This technique can be circumvented, since it is fairly easy to remove the included signals. Further, this technique is vulnerable to noise, especially acoustic noise.

OBJECTS AND SUMMARY OF THE INVENTION

Objects of the present invention include the following:

to provide information concerning broadcast or recorded segments to which audience members have been exposed;

to provide information concerning the broadcast or recorded segments to which audience members have been exposed despite the presence of significant ambient noise;

to provide methods and apparatus for encoding audio signals in which the codes are imperceptible as information to audience members;

to detect which segments were actually broadcast in a given time period;

to provide media exposure records for audience members to a centralized facility;

to receive information from a centralized facility via an encoded transmission hidden within a pre-existing transmission channel.

In one aspect of the present invention, information is encoded in audio signals to be broadcast or recorded. A code signal having a predetermined bandwidth is modulated with an identification signal having a narrower bandwidth than the predetermined bandwidth to produce an encoded signal. The encoded identification signal is mixed with the broadcast or recorded audio signal to produce an output signal.

In another aspect of the present invention, an encoded broadcast or recorded segment signal including an audio signal portion having an encoded identification signal are received. The encoded identification signal is produced by modulating a code signal having a predetermined bandwidth with an identification signal having a narrower bandwidth than the predetermined bandwidth. The audio signal portion is correlated with a copy of the code signal to recover the identification signal.

In some applications, the receiving and correlating is carried out by a personal unit worn or carried on the person of an audience member, that produces a record of the broadcast or recorded segments to which the audience member has been exposed. This record, with identification of the audience member, is uploaded to a centralized facility.

A separate monitoring unit performs receiving and correlating in like manner as the personal units and may also extract additional information contained in the broadcast or recorded segment to produce a full record of what was broadcast. This monitoring unit communicates with the centralized facility to upload information thereto.

The centralized facility matches the individual audience records with the additional information pertaining to the items in these records to provide a full record of who was exposed to what, and when.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIGS. 3A–3K are frequency use charts used in explaining the embodiments of FIGS. 1, 2A, 2B and 2C;

DETAILED DESCRIPTION OF CERTAIN ADVANTAGEOUS EMBODIMENTS

Figure 1:
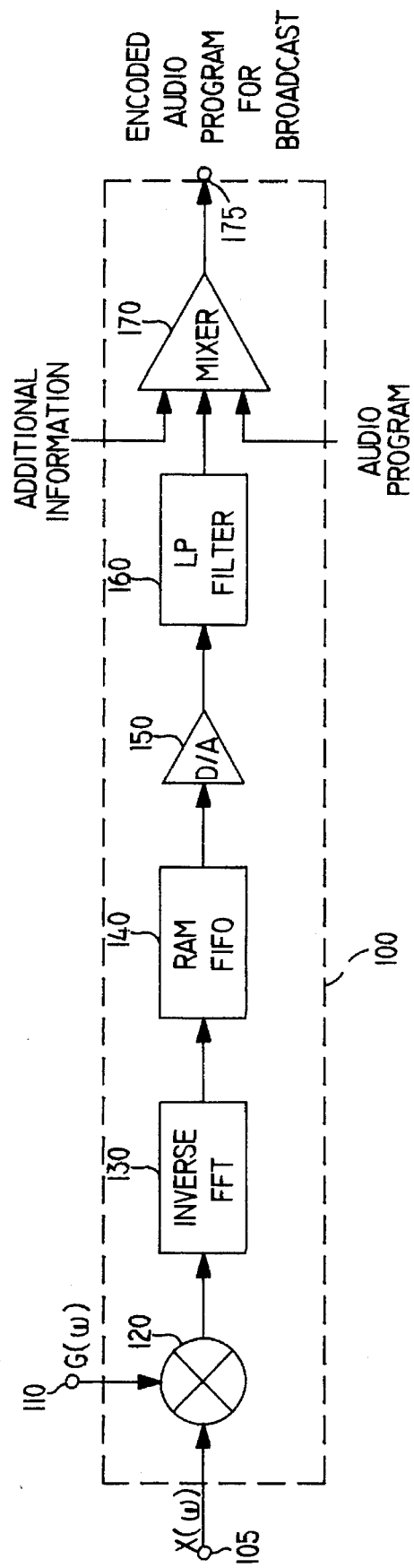
FIG. 1 is a block diagram of an encoder in accordance with an embodiment of the present invention.

In certain advantageous embodiments, the present invention adds identifying information to the audio portion of a broadcast segment before the segment is broadcast using a spread spectrum technique selected from among several alternatives, and includes a passive monitoring device which operates without human action to sense the identifying information in the broadcast segment and record it. The terms "meter" and "metering device" are sometimes used herein to refer to devices such as passive broadcast monitoring devices. At periodic intervals, the recorded information in each meter is uploaded to a centralized data processing facility for permanent storage.

In such embodiments, the spread spectrum techniques employed typically encode identifying information having a relatively low data rate and formed into an identification signal having a narrow bandwidth, referred to herein as $X(w)$, $x(t)$ or $x(n)$. As used herein, the term "signal" includes both an electrical signal and a representation of information which is stored, processed and/or transmitted, as well as any other form in which information is embodied. The term "bandwidth" as used herein includes a difference between frequency band limits as well as a frequency interval or range of frequencies. The explanations of terms as used herein are provided for exemplary purposes, and are not intended to be limiting, as appropriate other meanings for such terms may occur to those of ordinary skill in the art. In an advantageous embodiment, the thus-formed identification signal is modulated by a code signal, also known as a spreading signal, which is independent of the data and has a much wider bandwidth.

The code signal is a pseudo-random signal which, after modulation with a broadcast segment, will be perceived, if at all, as a low-level white noise, generally referred to as hiss, and not as information. The code signal is mixed into the audio signal at a level sufficiently below the regular broadcast audio signal level to make it imperceptible as information, and in the alternative, may be mixed with the audio signal at lower levels depending on the manner in which the audio signal is acquired for decoding, for example, as a baseband signal versus an acoustically reproduced signal.

One advantageous code is a sequence of tones added to the voiceband, which occupies approximately 300–3,000 Hz, since all broadcast formats and all reception equipment provide for reproduction of voice information of at least reasonable quality.

At each metering device, the audio signal portion of the broadcast segment is subjected to a correlation process, such as one of the processes described below, with a synchronized reference copy of the code signal to recover the identification signal, compared with valid information items (such as valid channels in the relevant geographic area), and subsequently stored.

Due to the use of spread spectrum encoding, the identifying information may be successfully recovered despite the presence of substantial ambient noise in the audio bandwidth in which the code signal is transmitted. Furthermore, the encoded identification signal can be made imperceptible to the audience.

In certain embodiments, the audio signal portion, typically 20–22,000 Hz, of a segment to be broadcasted is encoded with station, channel or other program source identifying information by mixing it with a code signal modulated with an information signal which conveys this information. The information uniquely identifies the particular broadcasting source. The amount of information per broadcast segment can be kept short, if only broadcast times and the source of the broadcast, that is, the station or channel and not necessarily the identity of the program segment, are transmitted.

A passive meter, preferably worn by a selected member of the audience on his or her person, recovers the source identifier and stores it in a local memory with a time and date stamp. At the end of each day, the meter is put into a base unit so it can be recharged, its recorded information can be extracted, and, if desired, new information can be loaded into the meter. The extracted information may be collected by a storage and transmission unit in the household, and either the base unit or the storage and transmission unit may be employed to transmit the information over a dial-up telephone line to a centralized facility when the telephone line is not used by a member of the household. Several passive meters can be served by a single base unit or storage and transmission unit. Alternatively, the meter may be physically sent to a centralized facility to extract its recorded data.

Furthermore, additional information regarding the broadcast segment, for example, identifying the particular program or commercial, is also encoded into the audio signal portion of the segment. This additional information may use a code signal having a frequency range substantially coextensive with the full range of the audio signal, or having a range above the voiceband but within the audio signal range, for example, 4,000–20,000 Hz. Alternatively, the additional information may be formed into an additional information signal which directly modulates the audio signal, that is, without spread spectrum encoding, below or above the voiceband, or which modulates another portion of a broadcast segment, such as a video signal.

A separate monitoring device receives the baseband broadcast segment and extracts therefrom the additional information regarding the broadcast segment, and sends it to the centralized data processing facility where it is matched with the source identification information from the personal monitoring devices, to provide a full audience record of who was exposed to what, and when. Alternatively, the separate monitoring device may be located at the broadcast site, for example, at the headend of a cable system, and may monitor the signals immediately before they are cablecast.

An advantageous method for spread spectrum encoding of the source identification information utilizes direct sequence encoding in the frequency domain. Alternative methods include direct sequence encoding in the time domain, and frequency hopping. Each of these methods is further described below. However, the present invention is not limited to these methods, and other spread spectrum methods using time hopping or pulse-FM systems, or a hybrid method, are feasible.

An embodiment of the present invention will now be described in connection with FIG. 1, which shows an encoder, FIG. 2A, which shows a personal monitor, and FIGS. 3A–3K, which show frequency use charts.

FIG. 1 shows an advantageous embodiment of an encoder 100 according to the present invention. Encoder 100 includes input terminals 105 and 110, modulator 120, inverse transformer 130, buffer 140, digital-to-analog (D/A) converter 150, low pass filter 160, mixer 170 and output terminal 175.

Source identification signal $X(\omega)$, composed in bit form in the frequency domain, is supplied to the input terminal 105, while a frequency domain antipodal code signal $G(\omega)$ also in bit form is supplied to the input terminal 110. An antipodal signal has only opposed values, such as "1" and "−1". In this instance, the values of both $X(\omega)$ and $G(\omega)$ are composed of real numbers, and imaginary portions thereof are set of zero. These signals are described in detail below.

As used herein, "bit" refers to a unit of data, such as a portion of a source identifier, and "chip" refers to an elementary unit of a code. One bit corresponds to many chips, since the bandwidth of the information signal is narrower than the predetermined bandwidth of the code signal. In the frequency domain, each chip is represented by a "point" which is essentially a data value.

The code signal can be changed, for example, on a daily basis, to meet a variety of needs, such as identification of taped replays, limiting the collected data to a predetermined survey time period, or discouraging unauthorized access. Code signals can be provided to one or more encoders from a centralized facility via any of a number of transmission techniques. For example, the code signals can be transmitted via the public switched telephone network, a local area network, satellite transmission, or as data encoded in a broadcast in the manner described below in connection with FIG. 9. Use of different codes for radio and television enables the same personal monitor to collect radio or TV only data. Alternatively, codes may be assigned based on geographic location, or to restrict audience exposure monitoring to only commercial advertisements.

The source identification signal, $X(\omega)$, and the code signal, $G(\omega)$, are supplied to modulator 120, which modulates these signals using, for example, direct multiplication, logical exclusive OR, or another combining technique for individual frequency components, to form a frequency domain encoded source identification signal.

A frequency domain encoded signal, when properly selected, has the property of matching its spectrum to the typical frequency response of the receiver circuitry and speaker in use by an audience member, as well as to compensate for the room or other acoustic environment in which monitoring will occur.

The frequency domain encoded source identification signal is supplied to inverse transformer 130, which performs an inverse fast Fourier transform (FFT) or wavelet transform so as to produce a time domain encoded source identification signal that is supplied to buffer 140, which holds, for example, 2,048 data items, and is shown as a random access memory used according to a first-in-first-out scheme. The contents of buffer 140 are fed to D/A converter 150, which is a 16-bit converter, for example, thereby providing about a 90 dB range of levels in the analog encoded identification signal.

In one embodiment, the converter 150 samples at a rate of 8,192 samples per second. The length of buffer 140 corresponds to one bit time at the selected sampling rate, that is, (8,192 samples per second)/(4 bits per second)=2,048 samples/bit. The corresponding FFT has a length of 1024 points in the frequency domain, with each point corresponding to 4 Hz. The 676 points within the frequency range 300–3,000 Hz are used, while the 75 points corresponding to the range 0–296 Hz and the 273 points within the range 3004–4092 Hz are not used. The analog encoded identification signal is supplied to low pass filter 160, which removes spurious signals outside of the desired range.

At the mixer 170, the filtered encoded identification signal is combined with the audio portion of a segment in a ratio selected to maintain inaudibility and supplied to an output terminal 175 of the encoder 100, and is then broadcast with the other portions of the segment, if any, in a conventional manner such as by RF, satellite or cable broadcast, or is recorded on tape or other recording medium. The level at which the encoded identification signal is combined is chosen to be approximately the normal noise level tolerated by most audio programs. Additional information, intended for a monitoring device distinct from the personal monitor, may also be separately supplied to mixer 170, for combination with the encoded identification signal and audio portion.

The modulating through mixing processing steps performed in the aforementioned elements of the encoder 100 are repeated until the source identification information is fully encoded in the audio portion of the segment to be broadcast or recorded. These steps can be repeated to encode the source identification in various places or continuously through the audio portion of the segment. The succeeding identification information may be changed to reflect a change in the source of the segment, or as otherwise appropriate.

Figure 2A:
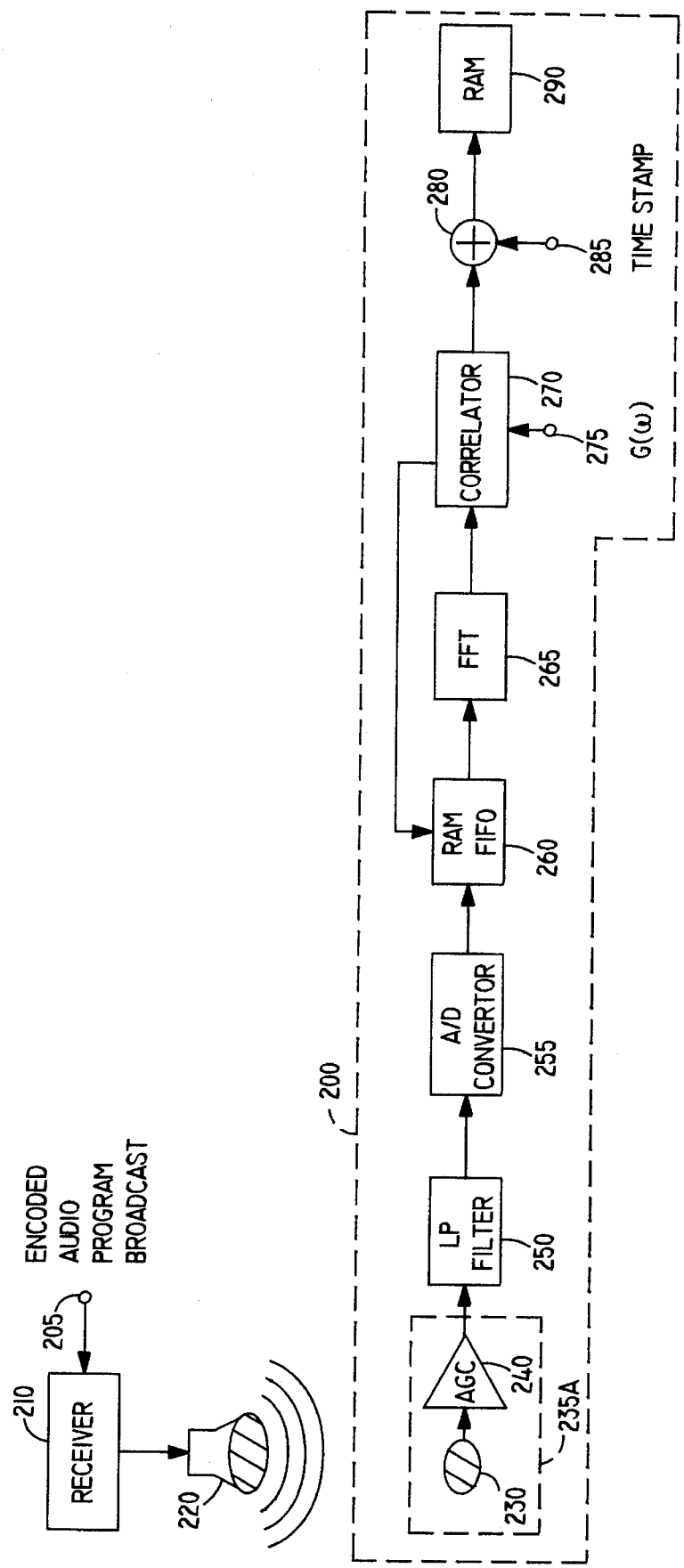
FIGS. 2A, 2B and 2C are block diagrams of personal monitors for use with the encoder of FIG. 1.

FIG. 2A shows one advantageous embodiment of a personal monitor 200 according to the present invention. Personal monitor 200 includes a microphone 230, amplifier 240, low pass filter 250, analog-to-digital (A/D) converter 255, buffer 260, transformer 265, correlator 270, input terminals 275 and 285, combiner 280, and memory 290. The outer dashed line in FIG. 2A generally indicates the enclosure of a metering device to be worn on the person, e.g., clipped to a garment worn by the audience member.

As shown in FIG. 2A, the encoded audio portion of the broadcast segment is received at an input terminal 205 of a typical broadcast receiver 210, which acoustically reproduces the audio portion using a speaker 220. Receiver 210 and its speaker 220 represent devices normally used in households and elsewhere by audience members to acoustically reproduce broadcast audio signals. Alternatively, a recorded segment containing an encoded audio portion may be reproduced, such as by a video cassette recorder, and the audio portion thereof acoustically reproduced by a speaker such as speaker 220.

The acoustically reproduced audio portion of the broadcast or recorded segment is received by the microphone 230 of the personal monitor 200, which transduces the acoustic energy into an electrical signal. The transduced electrical signal is supplied, via a physical line or wireless transmission, to amplifier 240 shown as an automatic gain control amplifier, which produces an output signal at an increased power level.

Figure 2B:
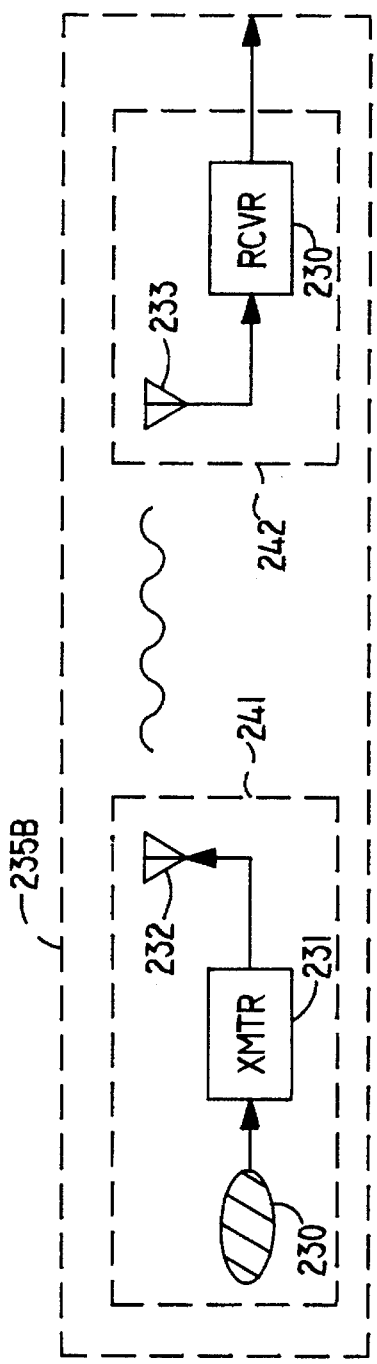

In FIG. 2A, the combination 235A of microphone 230 and amplifier 240 is shown as contained within the personal monitor 200 worn by an audience member. An alternative arrangement is depicted in FIG. 2B, showing a combination 235B which functionally corresponds to the combination 235A. The combination 235B includes a first unit 241, intended to be worn by an audience member and physically separate from the remainder of monitor 200, and a second unit 242 contained within an enclosure containing the remainder of monitor 200. The arrangement shown in FIG. 2B is intended especially for situations where the audience member is a child, or other situations where miniaturization of the apparatus worn by the audience member is advantageous.

The first unit 241 of combination 235B comprises microphone 230, transmitter 231 and antenna 232. The transduced electrical signal from microphone 230 is supplied to a transmitter 231 which is adapted for generating a signal suitable for wireless transmission from the transduced signal, which is supplied to antenna 232. The antenna 232 serves to produce a wireless transmission of the signal from transmitter 231.

The second unit 242 of combination 235B comprises antenna 233 and receiver 234. The antenna 233 is operative to receive the wireless broadcast from antenna 232, and convert it into a received electrical signal which is supplied to receiver 234 which serves to produce an output signal at an increased power level, corresponding to the output of amplifier 240.

Figure 2C:
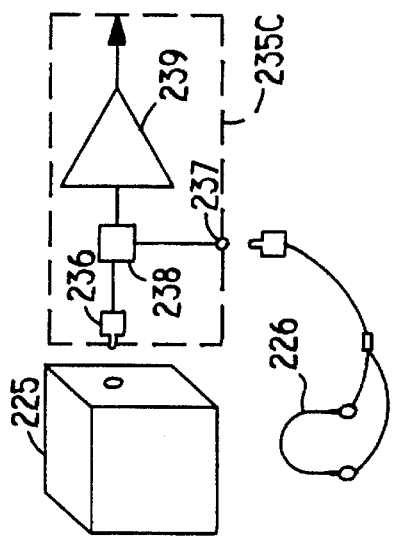

FIG. 2C shows another alternative combination 235C, for use when the audience member is exposed to radio broadcasts or reproduced sound via a portable device 225 carried on the person, typically used with headphones 226. The combination 235C includes an input terminal 236, which may be a jack, an output terminal 237, which may be a plug, a splitter 238, which may be simply a Y-cable, and an amplifier 239. The input terminal 236 is adapted to be coupled to the portable device 225, and to receive therefrom a broadcast audio signal which is supplied to splitter 238. The splitter 238 is operative to supply a copy of the signal from input terminal 236 to both amplifier 239 and output terminal 237. The amplifier 239 produces an output signal at an increased power level.

The signal from amplifier 240, receiver 234 or amplifier 239 is supplied to A/D convertor 255 via filter 250. The level of the amplified signal corresponds to about 50% of the maximum range of the convertor 255. Filter 250 performs low pass filtering on the amplified signal to remove any frequencies above the maximum frequency of the code signal, which is 3,000 Hz in one embodiment, preventing higher frequency information from being aliased into the frequency domain in which the encoded information is present.

Convertor 255 converts the filtered signal to a series of 16-bit values, and supplies these values as a converted signal to buffer 260, which stores the converted values before supplying them to transformer 265 where they undergo a transformation to the frequency domain, such as a fast Fourier transform or wavelet transform. Buffer 260 stores the values in a manner which permits a sliding transform to be performed for the purposes of synchronization and tracking, discussed below.

The frequency domain signal and a copy of the code signal $G(\omega)$ supplied at input terminal 275 are transmitted to correlator 270, which correlates these signals to produce a recovered source identification signal $X'(\omega)$. As part of the correlation process, the copy of the code signal $G(\omega)$ is synchronized with the received signal by appropriately adjusting readout from the buffer 260, as described above, to ensure that the FFT or wavelet transform occurs with the correct set of time domain data. The code signal may be hardwired into the personal monitor, but preferably is downloaded thereto to facilitate changing of the code, as discussed above. Signal recovery and synchronization are explained in more detail below.

Although it is not shown for ease of illustration, a central processing unit may be provided within personal monitor 200 to assist in the synchronization and other data management functions.

The correlator 270 produces an output signal, representing bits corresponding to the recovered source identification signal X'(ω), which is combined with a timestamp supplied at input terminal 285 and transmitted to memory 290 for storage, and subsequently transferred to a centralized data processing facility with additional information to identify the audience member. The additional information may be a serial number or other identifier assigned to the monitor 200, which is used by the centralized facility as an index to a look-up table associating monitor serial numbers with audience members. The additional information may be stored in the memory 290, or, for example, in a ROM. In the case of the embodiment of FIG. 2B, the transmitter 231 transmits an appropriate serial number or identifier for identifying the person wearing the unit to be combined with the timestamp, as described above, for transmission to the centralized data processing facility as such additional information. This permits the use of a single wireless transmission channel. In the alternative, each wireless transmitter 231 for use within a given household is assigned a unique transmission channel which enables the monitor 200 to identify the wireless transmitter 231 and, thus, the corresponding audience member.

This transfer of the information from memory 290 may occur by physically delivering the personal monitor to the centralized facility, or by reading out the timestamped data to a base station located, for example, in the residence of the audience member, and then through a dial-up communication link between the base station and centralized facility.

The operation of encoder 100 and personal monitor 200 will now be explained.

Referring again to FIG. 1, D/A converter 150 samples at a rate of 8,192 samples per second, as noted above. At the minimum Nyquist rate, this corresponds to a signal rate of 4,096 Hz. The frequency components from 0 up to 4,096 Hz are selected in accordance with a balance chosen between desired data rate and error rate. As shown in FIG. 3A, in this embodiment, only the 676 points corresponding to a frequency range of 300–3,000 Hz are used.

As shown in FIG. 3D, a code signal G(ω) of length 676 points is selected, with each point or value of the code signal corresponding to a 4 Hz interval. This code signal has pseudo-noise characteristics to facilitate the synchronization process and to reduce the perceptibility of the encoded information, and is also optimized for the frequency response characteristics of the typical receiver 210 and speaker 220.

The source identification data, comprising a sequence of bits representing the source of a broadcast, such as "channel 4", and a time and/or date stamp appended to or alternating with the source information, such as "09:32 1/30/92", or numeric representations thereof, is defined. Alternatively, for recorded segments, data may be defined at the time of recording identifying the individual program and associated timestamps for detecting playback speed by comparing the recorded, associated timestamps with the timestamps generated in the personal monitor 200. FIG. 3B shows such a sequence, expressed as binary numbers, namely, "1 0 1 . . . 1".

In accordance with a chosen spreading ratio, the identification data is mapped or spread into an identification signal X(ω) having a number of points equal to the number of points in the code signal. The encoder of FIG. 1 uses an effective spreading ratio of 1352:1, that is, two transformations contain all of the chips of a corresponding bit, but FIG. 3C shows a ratio of only 10:1 for ease of illustration. That is, each bit of the source identification data corresponds to 10 points of the identification signal X(ω) shown in FIG. 3C.

Modulator 120 modulates the antipodal code signal G(ω) and the identification signal X(ω) to form a modulated signal X(ω)G(ω), shown in FIG. 3E. When an antipodal signal is represented as a binary data stream, a binary "0" may correspond to an antipodal "+1" signal level, while a binary "1" may correspond to an antipodal "−1" signal level. Specifically, points of each of the signals X(ω) and G(ω) corresponding to the same 4 Hz frequency interval are multiplied together, which yields a result corresponding to that of an exclusive OR operation.

The set of points representing the modulated signal in the frequency domain is inverse transformed at inverse transformer 130, to produce a time domain encoded source identification signal, which is then mixed with the audio portion of a segment and broadcast or distributed on prerecorded media.

At personal monitor 200, transformer 265 transforms the received signal into a set of points in the frequency domain. Assuming perfect reception of the encoded signal, the set of points recovered corresponds exactly to the modulated signal shown in FIG. 3E.

Correlator 270 correlates the recovered set of points with the set of points for the synchronized code signal G(ω) by multiplying points of the two signals corresponding to the same 4 Hz frequency interval to produce a recovered source identification signal X'(ω), which is shown in FIG. 3F. The bits corresponding to X'(ω) are recovered, for example, by taking the average value of the points into which a bit was spread at the encoder. In this example, the average value of ten points for each bit as shown in FIG. 3F is obtained to yield the values shown in FIG. 3G. Other methods are suitable for recovering the identification bits, such as correlation with the shape of the waveform.

FIGS. 3H–3K illustrate bit recovery when the received signal includes noise. FIG. 3H shows a recovered set of points from transformer 265. As shown in boldface, the first 10 points include two recovered points in error, while the second 10 points include a string of four points in error, and the third 10 points include four points in error, alternating with points whose value was correctly recovered.

The recovered source identification signal X'(ω) based on the noisy data is shown in FIG. 3J, and is seen to include points whose value is in error. FIG. 3K shows the average value for each of the recovered bits. When the average values are rounded to the nearest binary value (zero or one), the source identification data is seen to be recovered perfectly, despite the presence of error in up to four of the ten points for each bit, that is, correct reception of only six of the ten points.

As mentioned, the present embodiment uses 676 points for each half-bit, that is, two transformations contain all of the chips in a corresponding bit, so the values of only 339 of the 676 points need be correctly received for perfect recovery of the source identification data.

In general, the personal monitor 200 records only events such as a change in source identification data, typically caused by changing the channel on a television or radio set, and a timeout failure, typically caused when the audience member is either out of detectable range or no longer wearing the monitor 200.

The audience member may record a broadcast segment and play it back at a later time. This may be detected at the centralized data processing facility by comparing a timestamp contained in the recovered identification data with a timestamp appended by the personal monitor when it stores the recovered identification data. Similarly, detection of when the audience member alters the normal playback of the segment may be accomplished by noting changes in the time difference between the recorded segment and the monitor timestamp.

If the audience member mutes the volume of the sound signal for a sufficient time during a broadcast, the personal monitor records a loss of signal event. When the volume of the sound signal is restored to detectable levels, the personal monitor records this as a change in source identification data. With appropriate analysis of the uploaded audience records, the centralized facility may detect "commercial zapping", which permits advertisers to gauge audience reaction to the audio portions of their commercials.

The present invention is also useful for detecting unauthorized copying of recorded segments, such as music or video pre-recorded on tape or disc for sale, that is, "tape pirating". Specifically, the encoded data in a recorded segment identifies the individual program and may also identify a serial number for the particular copy, such as on cassette or disc, of the recorded segment. If the uploaded records or exposure diaries of several audience members include the same program and particular copy serial number, then it is possible that the segment has been illegally copied.

Using the present invention, audience surveys may readily be restricted to a selected timeframe in a variety of ways, such as a test, performed by software in the personal monitor, of whether the date is within the survey timeframe; loading or downloading of codes to the personal monitor which are operative only during the selected timeframe; selection by the personal monitor among a set of internally stored codes based on the date or time; use of code signals based on the date and/or time; and analysis of uploaded audience diaries at the centralized facility.

Figure 4A:
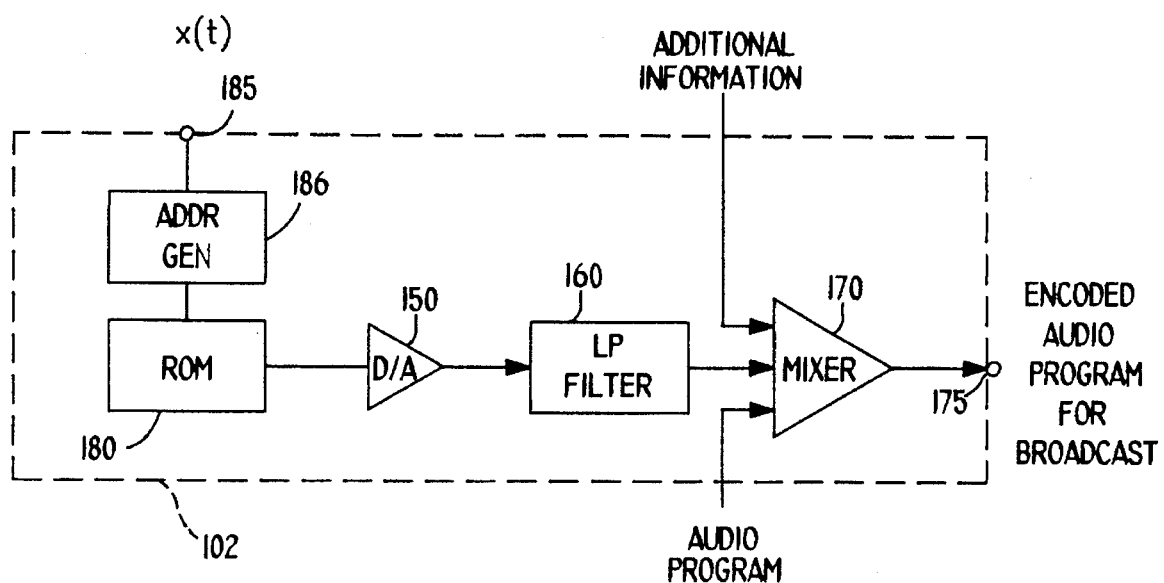
FIG. 4A is a block diagram of an encoder in accordance with another embodiment of the present invention.

FIG. 4A shows an encoder 102 in accordance with another embodiment of the present invention. Encoder 102 includes input terminal 185, address generator 186, read only memory (ROM) 180, D/A converter 150, low pass filter 160, mixer 170 and output terminal 175.

A source identification signal, x(t), which may be in bit form in the time domain, is supplied to address generator 186 via input terminal 185. In response to each bit of the identification signal x(t), the address generator 186 produces a set of addresses and sequentially supplies each address of this set to ROM 180 which contains data corresponding to code signals in the frequency domain which have undergone an inverse transformation and are stored as data in the time domain. ROM 180 reads out the content of the memory location specified by each of the addresses and supplies the content as a time domain source identification signal to D/A converter 150. A description of D/A converter 150, low pass filter 160, mixer 170 and output terminal 175 is provided above in connection with FIG. 1.

In operation, presentation of each bit of the identification signal x(t) at input terminal 185 causes a string of values to be read out of ROM 180 as a time domain source identification signal. In the simplest case, x(t) may assume two values, for example, zero and one, and ROM 180 contains data corresponding to a first code signal at addresses 1–2,048, and data at addresses 2,049–4,096 corresponding to a second code signal. If required, ROM 180 may store additional codes. In the present example, when the value of x(t) is zero, the first code signal at addresses 1–2,048 is read out, while, when the value of x(t) is one, the second code signal at addresses 2,049–4,096 is read out.

ROM 180 is also shown as performing the function of buffer 140 of FIG. 1, but a separate buffer may be provided in encoder 102, if desired.

Figure 4B:
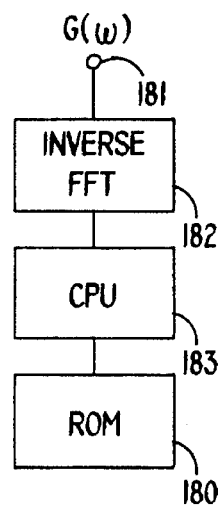
FIG. 4B is a block diagram of an apparatus for programming a ROM of the FIG. 4A encoder with time domain code signals.

FIG. 4B shows an apparatus for programming ROM 180 of FIG. 4A, which includes input terminal 181, inverse transformer 182 and processor 183.

A frequency domain antipodal code signal G(ω) in bit form is supplied to inverse transformer 182 via input terminal 181. Inverse transformer 182 is similar to inverse transformer 130 of FIG. 1, and performs an inverse FFT or wavelet transform so as to produce time domain code data that is supplied to processor 183. The processor 183 generates appropriate write addresses, and supplies these write addresses to ROM 180 so that the time domain code data is stored, that is "burned in", at these write addresses.

This process is repeated for at least one additional code signal G(ω), which may be an inverted copy of the first code signal. The burned-in ROM 180 containing the code data may now be used in encoder 102.

As will be appreciated, the apparatus of FIG. 4B may be located at a master site, while each of a plurality of encoders 102 of FIG. 4A is located at a separate site, achieving economies relative to the configuration of FIG. 1, since the inverse transformer 182 is needed at only the master site.

Figure 4C:
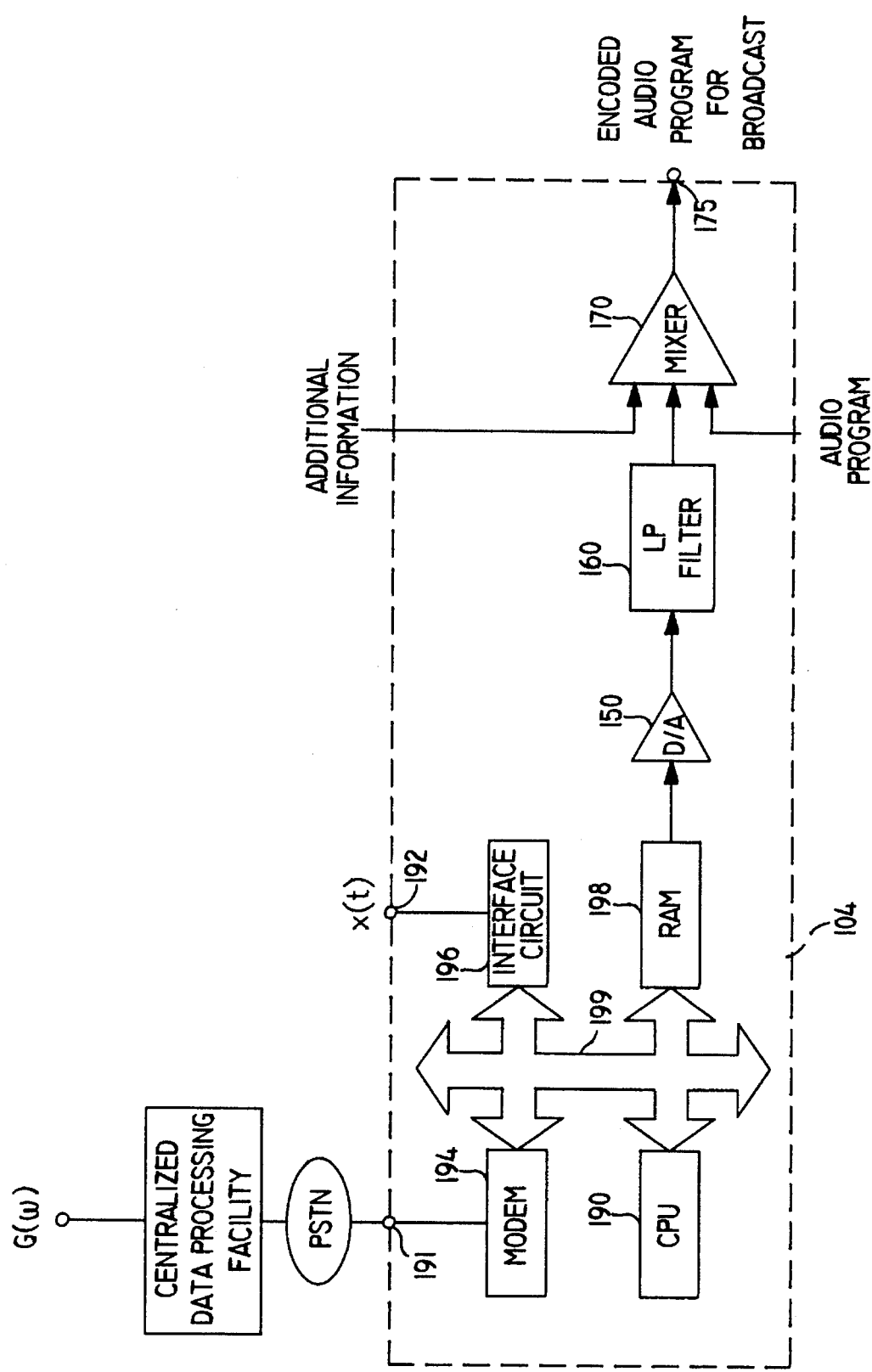
FIG. 4C is a block diagram of an encoding system in accordance with another embodiment of the present invention.

FIG. 4C shows an encoding system in accordance with yet another embodiment of the present invention. The encoding system of FIG. 4C includes encoder 104, a telephone network and a centralized data processing facility. Encoder 104 includes input terminals 191 and 192, processor 190, modem 194, interface circuit 196, random access memory (RAM) 198, data bus 199, D/A converter 150, low pass filter 160, mixer 170 and output terminal 175.

A set of frequency domain antipodal code signals, G(ω), in bit form is supplied to the centralized data processing facility, which performs inverse FFTs or wavelet transforms using an inverse transformer, not shown for ease of illustration, so as to produce a set of time domain code data. The centralized data processing facility then establishes a communications link with encoder 104 and downloads the set of time domain code data, and may also download corresponding write addresses for this code data, to encoder 104. In FIG. 4C, the communications link is depicted as being established through the public switched telephone network (PSTN), but alternative communications links, such as are described below in connection with FIG. 9 may alternatively be used.

Downloaded data from the centralized data processing facility is received by modem 194 of encoder 104 via input terminal 191. After transmission over data bus 199, the downloaded data is stored in RAM 198, at addresses downloaded as part of the data, or at addresses generated by processor 190. Once the code data is stored in RAM 198, the RAM 198 functions in a similar manner as ROM 180 of FIG. 4A.

The identification signal x(t) is supplied to interface circuit 196 via input terminal 192. The processor 190 generates a set of read addresses for each bit of the signal x(t), and supplies these addresses to RAM 198 via data bus 199. Alternatively, interface circuit 196 may be operative to generate a set of addresses and supply them to RAM 198 via data bus 199. Each bit of signal x(t) causes read out of data from RAM 198 to produce a time domain source identification signal in the same fashion as the embodiment of FIG. 4A.

The operation of the D/A converter 150, low pass filter 160, mixer 170 and output terminal 175 are described above in connection with FIG. 1.

Figure 5:
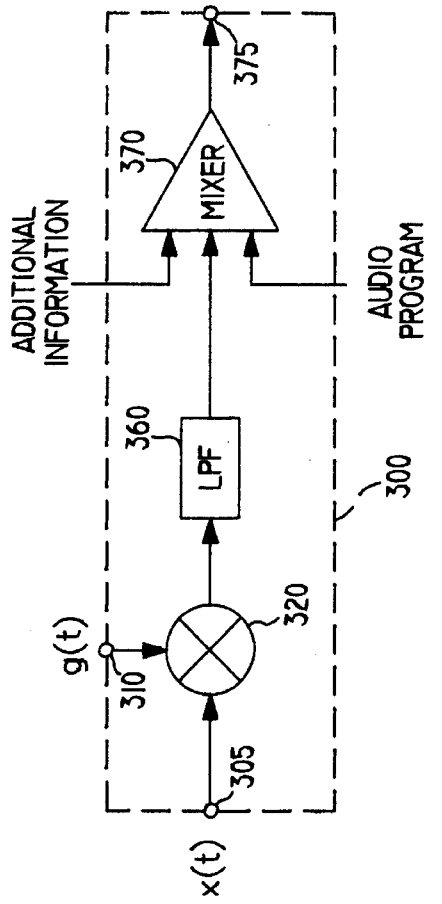
FIG. 5 is a block diagram of an encoder in accordance with a further embodiment of the present invention.

FIG. 5 shows another embodiment of an encoder in accordance with the present invention, wherein direct sequence spread spectrum encoding in the time domain is employed. Encoder 300 includes input terminals 305 and 310, modulator 320, low pass filter 360, mixer 370 and output terminal 375.

Source identification signal x(t), expressed in the time domain, is supplied to input terminal 305, while a time domain code signal g(t) is supplied to the input terminal 310. The signals x(t) and g(t) are supplied to modulator 320, which modulates these signals to form a time domain encoded source identification signal that is supplied to low pass filter 360, which removes spurious signals outside of the desired range.

At the mixer 370, the filtered encoded identification signal is combined with the audio portion of a segment to maintain imperceptibility, as described above in connection with mixer 170 of FIG. 1, and then to the output terminal 375 of the encoder 200 for broadcast in a conventional manner.

Figure 6:
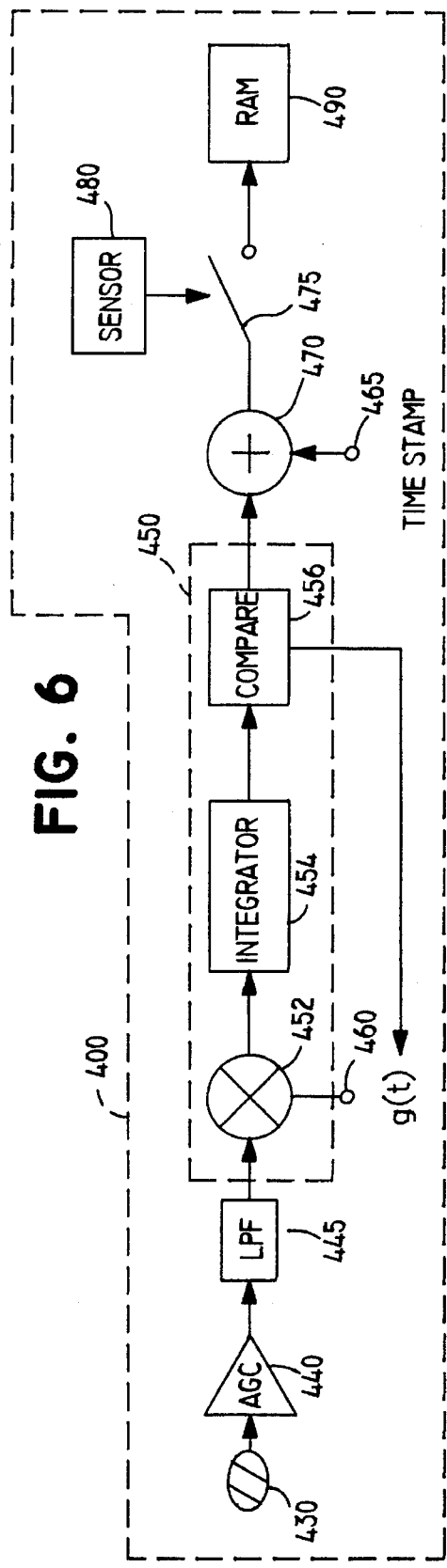
FIG. 6 is a block diagram of a personal monitor for use with the encoder of FIG. 5.

FIG. 6 shows another embodiment of a personal monitor 400 according to the present invention. Personal monitor 400 includes a microphone 430, amplifier 440, low pass filter 445, correlator 450 having a multiplier 452, integrator 454 and comparator 456, input terminals 460 and 465, combiner 470, switch 475, sensor 480 and memory 490. A central processing unit may also be provided in personal monitor 400, for similar reasons as discussed above with regard to personal monitor 200.

Microphone 430 transduces an acoustically reproduced audio portion of a broadcast segment to produce an electrical signal, as discussed above with regard to FIG. 2A. The electrical signal thus produced by microphone 430 is supplied to amplifier 440 and then to filter 445, which are similar to amplifier 240 and filter 250, respectively, of FIG. 2A. A copy of the code signal g(t), fed through terminal 460, and the filtered signal output from filter 445 are supplied to correlator 450.

Correlator 450 includes a multiplier 452, which multiplies the filtered signal and code signal, and supplies the multiplied result to an integrator 454, which integrates over a bit interval to produce an integrated signal that is fed to comparator 456. In the case of a bit rate of 4 bits per second, a bit interval is 0.25 seconds. Comparator 456 synchronizes the copy of the code signal with the incoming signal by sliding the code signal along the time window for integrating, that is, advancing or delaying which point of the code signal is defined as the start of the signal, so as to optimize the integrated signal.

More particularly, the source identification signal x(t) has the same logic state, zero or one, for each of the chips corresponding to one bit. If the broadcast signal is received without errors, then each of the chip values resulting from the multiplication of the copy of the code signal and the received filtered signal has the same value for the duration of a bit. Thus, synchronization is achieved when the result of integrating corresponds to an average chip value of zero or one. If the received signal and code signal are not synchronized, the result of integrating is an average chip value closer to 0.5 than to zero or one.

Once synchronization is acquired, adjustments may be made by sliding the time window so as to continue to track the incoming signal.

Typically, synchronization must be acquired for each segment to which the audience member is exposed. If the personal monitor fails to receive a signal for a sufficient amount of time, such as when the audience member goes to a different room, the monitor records this as a loss of signal event, and needs to reacquire synchronization when the audience member returns to the room in which the broadcast or playback is occurring.

After synchronization is acquired, comparator 456 outputs recovered source identification data to combiner 470, which combines it with a timestamp supplied at input terminal 465 to form a timestamped signal fed to switch 475.

Sensor 480 may be a thermal sensor or motion detection sensor, and is operative to sense whether the personal monitor 400 is being worn by a person, and thus that a person is receiving the broadcast, and to produce an enabling signal when the personal monitor 400 is worn by a person. This enabling signal may be used to control whether the personal monitor is active, in order to efficiently use the power source in the personal monitor, typically a rechargeable battery. Use of such a sensor is not limited to this particular embodiment, and may be incorporated into any embodiment of a personal monitor, such as the personal monitor 200 shown in FIG. 2A. The enabling signal from the sensor is supplied to switch 475.

When the enabling signal is active, switch 475 transmits the timestamped signal to memory 490 for storage, and subsequent transfer to a centralized data processing facility, as discussed above.

Alternatively, the signal from sensor 480 may be supplied to combiner 470, and switch 475 eliminated, so that the personal monitor 400 stores recovered identification data with its local timestamp and an indication of whether an audience member was wearing the monitor when recovery of the identification data occurred.

As yet another alternative, the present invention may be employed with a video cassette recorder (VCR), to monitor when broadcast segments are being recorded. Instead of an acoustically reproduced signal, the audio portion of the baseband signal output by the tuner of the VCR is assumed to contain an encoded identification signal. In this situation, the monitor serves to sense that a recording operation is occurring in the VCR, and to store identification information for the recorded signal. The resulting diary for the VCR may be uploaded in the same manner as the diary produced by the personal monitor 400.

Figure 7:
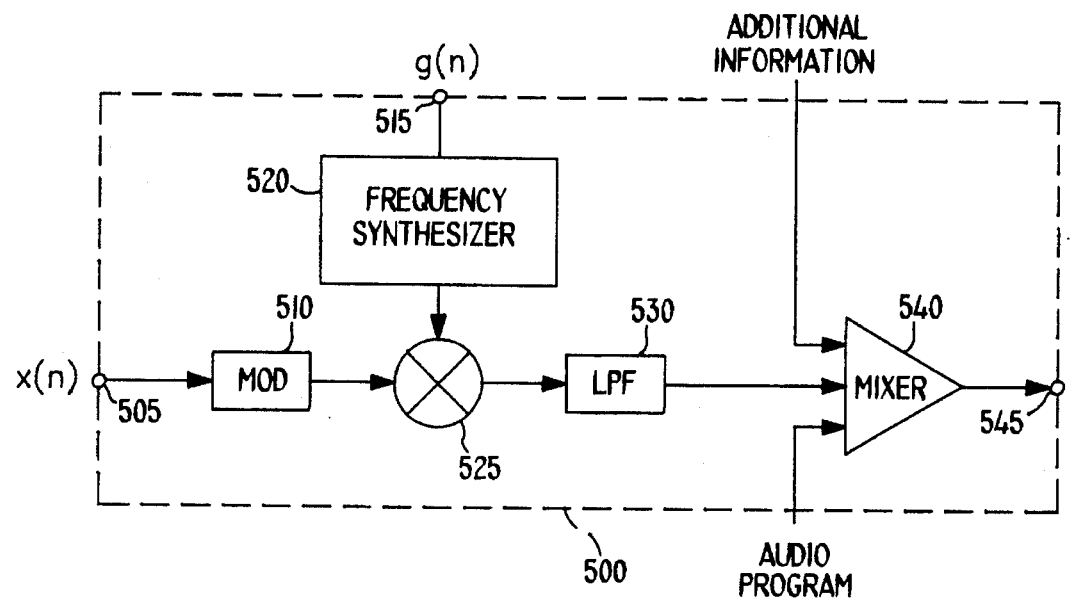
FIG. 7 is a block diagram of an encoder in accordance with still another embodiment of the present invention.

FIG. 7 shows still another embodiment of an encoder 500 according to the present invention. Encoder 500 includes input terminals 505 and 515, modulator 510, frequency synthesizer 520, mixers 525 and 540, low pass filter 530 and output terminal 545.

Source identification data x(n) is supplied via input terminal 505 to modulator 510, where it is modulated with a sinusoidal signal.

Code data g(n) is supplied via input terminal 515 to frequency synthesizer 520 to control the output of the frequency synthesizer 520. More specifically, the available bandwidth spans 300–3,000 Hz, and this is divided into M narrower bands each of bandwidth (3,000–300)/M Hz. At each chip time, the frequency synthesizer output is changed to the center frequency of one of the M bands, according to the code data g(n) specifying the band hopping sequence, to produce a frequency hopped code signal.

The sinusoidal signal carrying the source identification data and the frequency hopped code signal are supplied to mixer 525, where they are mixed to form an encoded identification signal that is fed to low pass filter 530, which removes spurious signals outside of the desired range.

The filtered encoded identification signal is supplied to mixer 540, along with the audio portion of a segment which is to be broadcast, and possibly additional information, which may provide further details regarding the source of the broadcast. Mixer 540 mixes these signals to produce an audio signal portion having an encoded identification signal at output terminal 545. The segment containing this audio portion is subsequently broadcast via a broadcast facility.

Figure 8:
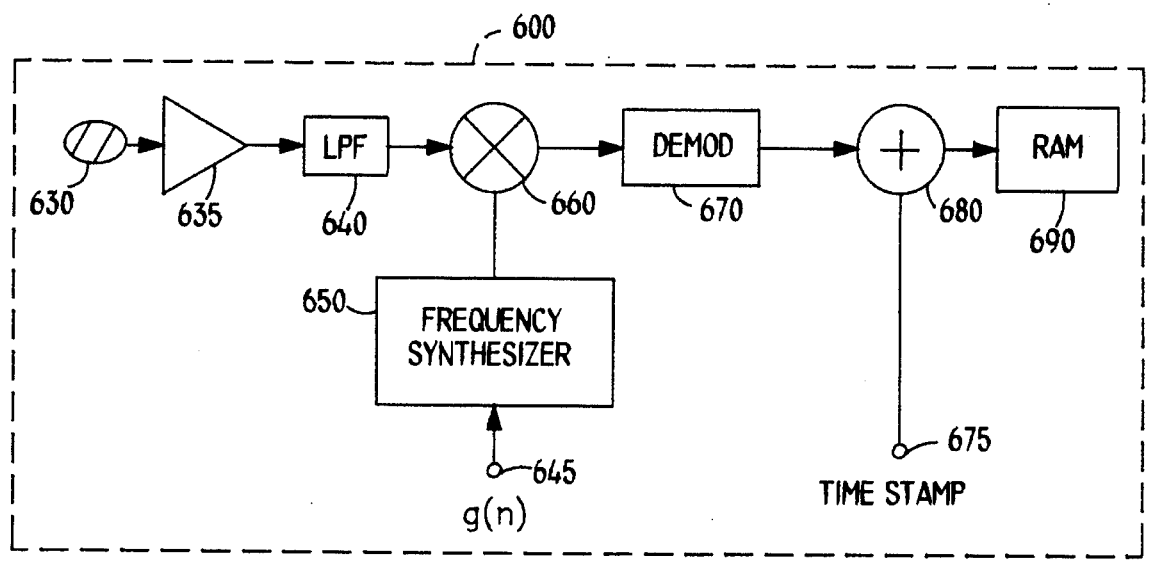
FIG. 8 is a block diagram of a personal monitor for use with the encoder of FIG. 7.

FIG. 8 shows yet another embodiment of a personal monitor 600 according to the present invention. Personal monitor 600 includes microphone 630, amplifier 635, low pass filter 640, input terminals 645 and 675, frequency synthesizer 650, mixer 660, demodulator 670, combiner 680 and memory 690. A central processing unit may also be provided in personal monitor 600, for similar reasons as discussed above with regard to personal monitors 200 and 400.

Microphone 630, amplifier 635 and low pass filter 640 perform in a similar fashion as the corresponding elements in FIGS. 2A and 6, and their description is omitted for brevity.

A copy of the code data g(n) is supplied via terminal 645 to frequency synthesizer 650 to control its output. The output of synthesizer 650 is identical in frequency to the output of synthesizer 520 of FIG. 7.

The filtered signal from filter 640 and the frequency synthesized signal from synthesizer 650 are supplied to mixer 660, which mixes them to recover the identification signal. In other words, mixer 660 correlates the filtered signal and frequency synthesized signal, in that the mixer places the signals in correspondence or mutual relationship.

The recovered identification signal is supplied to demodulator 670, where it is demodulated into recovered identification data, and then combined by combiner 680 with timestamp data supplied via terminal 675. The timestamped identification data is supplied to memory 690 for storage, and subsequent transfer to a centralized data processing facility, as discussed above.

Figure 9:
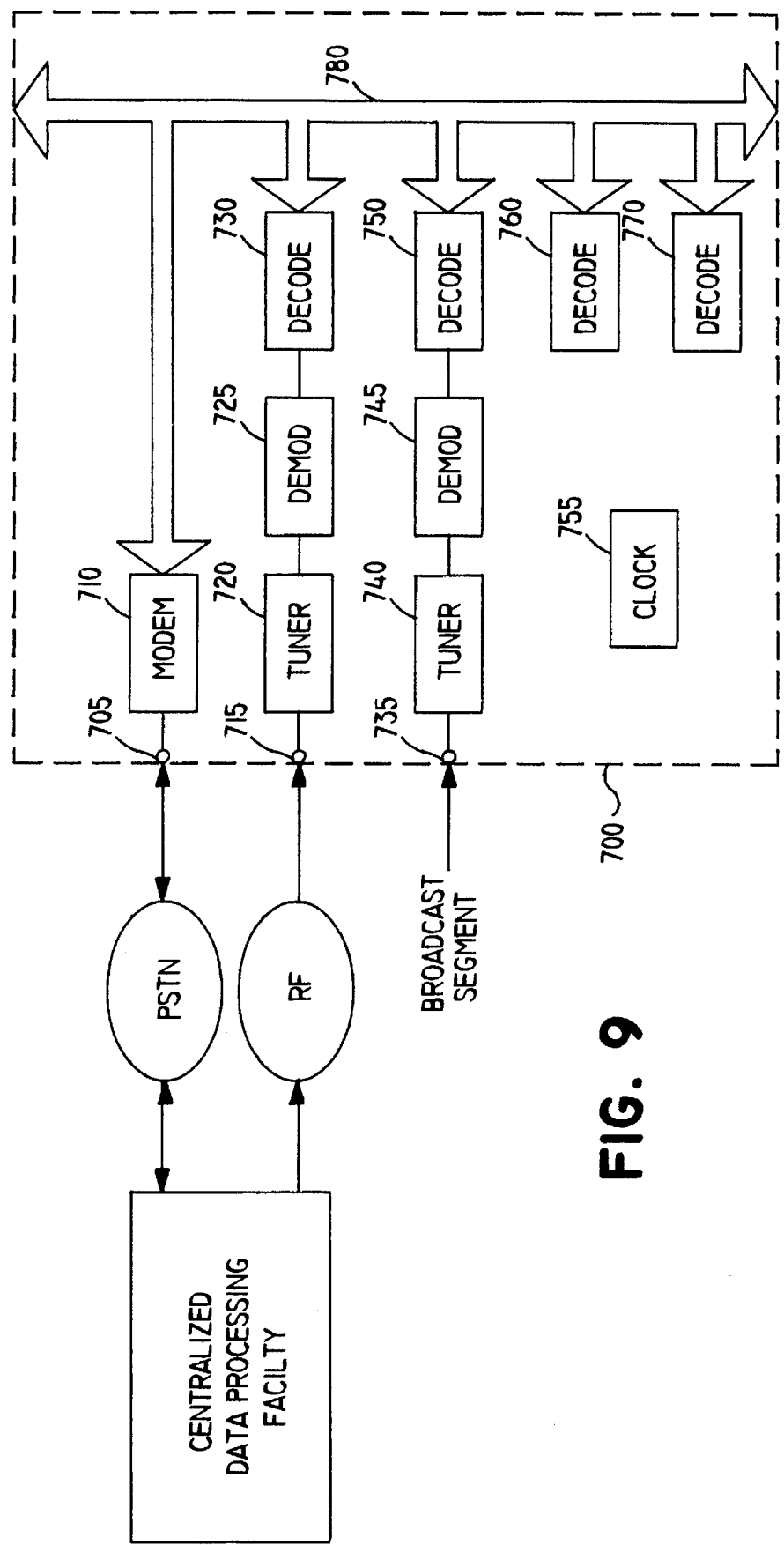
FIG. 9 is a block diagram of a monitoring unit in accordance with still another embodiment of the present invention.

FIG. 9 shows a monitoring unit 700 in accordance with another embodiment according to the present invention. Monitoring unit 700 includes terminals 705, 715 and 735, modem 710, tuners 720, 740, demodulators 725, 745, decoders 730, 750, clock circuit 755, memory 760, processor 770, and data bus 780. The clock circuit 755 supplies time and date information as needed to the various blocks of the encoder 700 in a conventional manner.

As shown in FIG. 9, a signal including a broadcast segment having an audio portion with an encoded source identification signal is received at the input terminal 735 of monitor 700, and supplied to tuner 740 and then demodulator 745 to recover a baseband broadcast signal. Alternatively, the tuner and demodulator may be in a separate unit, so that a baseband broadcast signal is supplied directly to monitor 700.

As another alternative, each broadcast source, such as a radio or television station may have an encoder, such as that shown in FIG. 1, 5 or 7 located on its premises, along with device which monitors which programs are actually aired, such as monitor 700. In this situation, it is possible for the encoder and monitor to be located within the same enclosure, thereby reducing the overall amount of equipment required, since the encoder and monitor may share memory, e.g., for the code signal, and a tuner and demodulator are not required, since the baseband signal is immediately available.

The baseband broadcast signal is supplied to the decoder 750, which extracts therefrom the source identification signal in a similar manner as used by the personal monitor, shown in FIGS. 2A, 6 and 8.

Decoder 750 also extracts the additional information present in the received broadcast segment, which, as discussed above, may be directly modulated with the audio portion, encoded using a spreading signal which is then mixed with the audio portion, or modulated with another portion of the broadcast segment. This additional information may include, for example, source identification information for advertisements or information relating to the identity of the program in the broadcast segment that is not present in the information encoded in the voiceband due to the limited capacity available therein.

For each broadcast segment, decoder 750 supplies the source identification information extracted from the voiceband, the additional information and appropriate timestamp information via data bus 780 to memory 760 for storage.

At periodic intervals, such as on a daily basis, the processor 770 detects that it is time to upload the information regarding broadcast segments which is stored in memory 760. Processor 770 causes modem 710 to establish a circuit in the public switched telephone network to the centralized data processing facility. Although a dedicated telephone line may be connected at terminal 705, a dial-up line is preferred for installation flexibility and cost savings. As an alternative, a wide area network may be employed for this purpose. After the circuit is established, processor 770 commands memory 760 to supply the information of interest to data bus 780, and commands modem 710 to transmit this information to the centralized facility. Alternatively, the centralized facility may issue commands to memory 760 to cause data transfer.

The monitor 700 may be employed to monitor broadcast signals in a given radio or television broadcast market in order to determine what segments have been broadcast at what time over one or more channels or by one or more stations. In one application, the monitor 700 decodes segment identification information to determine what programs, commercials and other segments were broadcast, so that this information can be supplied to the centralized data processing facility for correlation with personal monitor data from individual audience members. A further application is to determine the commercials broadcast over one or more channels or by one or more stations in order to generate reports for determining fees payable to broadcasters by advertisers or other parties purchasing broadcast facility usage, and/or to generate reports for market research.

In a further application, the monitor 700 gathers data indicating what copyrighted works have been broadcast by one or more stations or over one or more channels. For example, a radio station may broadcast a pre-recorded song numerous times, and this situation may be detected by the centralized facility with appropriate analysis of the uploaded information. The results of the analysis may then be used to determine responsibilities for the payment of copyright royalties.

The monitor 700 may also be employed for in-home monitoring to determine the programs, commercials or other segments reproduced or displayed by one or more radio or television receivers, with or without also monitoring the audience composition with the use of the present invention.

The centralized facility may also download information to monitor 700 via the telephone connection for immediate or delayed processing. This downloading may occur during a connection initiated by the monitor 700, or the centralized facility may initiate the connection. Examples of information to be downloaded include an updated code signal for the encoded source identification information, prompt screens (to be displayed on an in-home monitor) for collecting information from the user through a separate interface (not shown for purposes of simplicity and clarity), and executable program information. It is important that the monitor 700 remain under control of the centralized facility, to ensure that it is not locally corrupted.

The centralized facility may also supply information to a separate RF channel, for broadcast to the community of deployed monitor units 700. This RF channel is encoded in an existing FM broadcast using a spread spectrum encoding technique. The encoded FM broadcast is received at the input terminal 715 of monitor 700, and supplied to tuner 720 and then demodulator 725 to recover a baseband broadcast signal. Alternatively, the tuner and demodulator may be in a separate unit, so that a baseband broadcast signal is supplied directly to monitor 700. Decoder 730 extracts the encoded information from the FM broadcast, and supplies the extracted information via data bus 780 to memory 760. Alternatively, via data bus 780, decoder 730 may notify processor 770 of the reception of the information, and then respond to commands from the processor 770 regarding the disposition of the extracted information.

The monitor 700 may simultaneously receive information via the encoded FM broadcast supplied to terminal 715 and the broadcast segment supplied to terminal 735, and may also simultaneously receive or transmit data via terminal 705.

The encoded FM broadcast may be supplied to the encoder 700 via a cable or otherwise, rather than RF transmission.

Although illustrative embodiments of the present invention, and various modifications thereof, have been described in detail herein with reference to the accompanying drawings, it is to be understood that the present invention is not limited to these precise embodiments and the described modifications, and that various changes and further modifications may be effected therein by one skilled in the art without departing from the scope or spirit of the invention as defined in the appended claims.

What is claimed is:

1. A method for detecting encoded information in broadcast or recorded audio signals, comprising the steps of: receiving an encoded broadcast or recorded segment signal including an audio signal portion having an encoded identification signal, the encoded identification signal being produced by modulating a first code signal having a predetermined nonzero bandwidth and not derived from the audio signal portion with an identification signal having a narrower bandwidth than the predetermined nonzero bandwidth of the first code signal, correlating the audio signal portion with a second code signal corresponding to the first code signal and not derived from the audio signal portion to produce a correlated signal, and recovering the identification signal from the correlated signal.

2. A method according to claim 1, further comprising the step of synchronizing the second code signal with the encoded identification signal before the step of correlating.

3. A method according to claim 1, further including the step of transforming the audio signal portion to frequency domain information.

4. A method according to claim 1, wherein the step of correlating comprises multiplying the audio signal portion with the second code signal to produce a multiplied signal and wherein the step of recovering comprises integrating the multiplied signal.

5. A method according to claim 1, further comprising the step of frequency synthesizing in accordance with code data to produce the second code signal.

6. A method according to claim 5, wherein the step of correlating comprises mixing the audio signal portion with the second code signal.

7. A method according to claim 1, further comprising the step of storing the recovered identification signal as stored data.

8. A method according to claim 7, wherein the steps of receiving, correlating and storing are performed at each of a plurality of sites, and further comprising the step of sending stored data from the plurality of sites to a centralized data processing facility.

9. A method according to claim 1, further comprising the step of recovering additional information identifying at least one of station, channel and segment identity from the received encoded broadcast or recorded segment signal.

10. A method according to claim 9, further comprising the step of storing the recovered identification signal with the additional information.

11. A method according to claim 9, wherein the received encoded broadcast or recorded segment signal includes the additional information in the audio signal portion.

12. A method according to claim 11, wherein the received encoded broadcast or recorded segment signal includes the additional information substantially in audio signal frequencies above 3000 Hz.

13. A method according to claim 1, further comprising the steps of receiving a further broadcast including encoded broadcast data, the encoded broadcast data being produced by modulating a third code signal with a selected bandwidth by a broadcast data signal having a narrower bandwidth than the selected bandwidth; and correlating the further broadcast with a fourth code signal corresponding to the third code signal to recover the broadcast data signal.

14. A method according to claim 1, wherein the step of receiving the audio signal portion comprises receiving the audio signal portion from a device carried on the person of an audience member.

15. A method for detecting encoded information in broadcast or recorded audio signals, comprising the steps of: transducing an acoustically reproduced audio signal portion of an encoded broadcast or recorded segment signal to produce a transduced audio signal portion, the audio signal portion having an encoded identification signal produced by modulating a first code signal having a predetermined nonzero bandwidth and not derived from the audio signal portion with an identification signal having a narrower bandwidth than the predetermined nonzero bandwidth, the encoded identification signal being imperceptible as information in the acoustically reproduced audio signal portion, correlating the transduced audio signal portion with a second code signal corresponding to the first code signal and not derived from the audio signal portion to produce a correlated signal, and recovering the identification signal from the correlated signal.

16. A method to claim 15, further comprising the step of determining an identity of an audience member within audible range of the acoustically reproduced audio signal portion.

17. A method according to claim 16, wherein the step of transducing comprises transducing an acoustically reproduced audio signal portion of an encoded broadcast wherein the audio signal portion is encoded with an identification signal including information identifying a source of the encoded broadcast, and further comprising the step of transmitting the information identifying the source and information indicating the identity of the audience member to a centralized data processing facility for producing an estimate of the audience for the encoded broadcast.

18. A method according to claim 16, wherein the identification signal identifies a source of the encoded broadcast or recorded segment signal.

19. A method according to claim 18, further comprising the step of assembling the identity of the audience member and the source of the encoded broadcast or recorded segment signal with a designation of the identity of the encoded broadcast or recorded segment signal.

20. A method according to claim 16, wherein the identification signal identifies one of a source of the encoded broadcast or recorded segment signal and a designation of the identity of the encoded broadcast or recorded segment signal, and further comprising the step of assembling data associating the identity of the audience member with the one of a source of the encoded broadcast or recorded segment signal and a designation of the identity of the encoded broadcast or recorded segment signal.

21. A method according to claim 16, wherein the steps of transducing and correlating occur within a device carried on the person of the audience member.

22. A method according to claim 16, wherein the step of transducing occurs within a first device carried on the person of the audience member, and the step of correlating occurs within a second device, and further comprising a step of wirelessly transmitting the audio signal portion from the first device to the second device.

23. A method according to claim 16, further comprising the step of storing the recovered identification signal with a timestamp as stored data.

24. A method according to claim 16, wherein the step of correlating is limited to only a predetermined audience survey time period.

25. A method according to claim 24, wherein the step of correlating is limited to the predetermined audience survey time period based on the second code signal.

26. A method for determining a source or sources of at least one copyrighted work included in broadcast or recorded audio signals, comprising the steps of: receiving an encoded broadcast or recorded segment signal including at least one copyrighted work, the at least one copyrighted work including an audio signal portion having an encoded identification signal indicating a source of the at least one copyrighted work, the encoded identification signal being produced by modulating a first code signal having a predetermined nonzero bandwidth and not derived from the audio signal portion with an identification signal having a narrower bandwidth than the predetermined nonzero bandwidth, correlating the audio signal portion with a second code signal corresponding to the first code signal and not derived from the audio signal portion to produce a correlated signal, recovering the identification signal from the correlated signal, and assembling data representing the source or sources of the at least one copyrighted work.

27. A method according to claim 26, further comprising the step of recovering additional information indicating at least one of station, channel and identity of the at least one copyrighted work from the received encoded broadcast or recorded segment signal.

28. A method according to claim 27, wherein the identification signal identifies at least one of the station and the channel of the at least one copyrighted work, and the additional information indicates at least the identity of the at least one copyrighted work.

29. A method for determining a source or sources of at least one commercial advertisement in broadcast or recorded audio signals, comprising the steps of: receiving an encoded broadcast or recorded segment signal including at least one commercial advertisement, the at least one commercial advertisement including an audio signal portion having an encoded identification signal indicating a source of the at least one commercial advertisement, the encoded identification signal being produced by modulating a first code signal having a predetermined nonzero bandwidth and not derived from the audio signal portion with an identification signal having a narrower bandwidth than the predetermined nonzero bandwidth, correlating the audio signal portion with a second code signal corresponding to the first code signal and not derived from the audio signal portion to produce a correlated signal, recovering the identification signal from the correlated signal, and assembling data representing the source or sources of the at least one commercial advertisement.

30. A method according to claim 29, further comprising the step of recovering additional information indicating at least one of station, channel and identity of the at least one commercial advertisement from the received encoded broadcast or recorded segment signal.

31. A method according to claim 30, wherein the identification signal identifies at least one of the station and the channel of the at least one commercial advertisement, and the additional information indicates at least the identity of the at least one commercial advertisement.

32. A method of encoding information in audio signals to be broadcast or recorded, comprising the steps of: modulating a first code signal having a predetermined nonzero bandwidth and a plurality of frequency components simultaneously present therein with an identification signal having a narrower bandwidth than the predetermined nonzero bandwidth to produce an encoded identification signal having a broader bandwidth than the identification signal, and mixing the encoded identification signal with an audio signal to be broadcast or recorded to produce an output signal.

33. A method according to claim 32, further comprising the step of mixing the output signal with an additional information signal.

34. A method according to claim 32, further comprising the step of low pass filtering the encoded identification signal before mixing with the audio signal.

35. A method according to claim 32, further comprising the step of inverse transforming the encoded identification signal before mixing with the audio signal.

36. A method according to claim 32, further comprising the step of frequency synthesizing according to predetermined code data to produce the first code signal.

37. A method according to claim 32, wherein the step of modulating comprises modulating a code signal having a frequency spectrum matched to a frequency response characteristic of a device for acoustically reproducing the audio signal as broadcast or recorded.

38. A method according to claim 32, wherein the step of modulating comprises modulating a code signal having a frequency range of approximately 300–3000 Hz.

39. A method according to claim 32, in combination with the steps of receiving the output signal, correlating the received output signal with a second code signal corresponding to the first code signal to recover the identification signal, and storing the recovered identification signal as stored data.

40. A method according to claim 39, wherein the steps of receiving, correlating and storing are performed at each of a plurality of sites, and further comprising the step of sending stored data from the plurality of sites to a centralized facility.

41. A method of encoding information in audio signals to be broadcast or recorded and detecting the encoded information therein, comprising the steps of: modulating a first code signal having a predetermined nonzero bandwidth with an identification signal having a narrower bandwidth than the predetermined nonzero bandwidth to produce an encoded signal, mixing the encoded identification signal with an audio signal to produce an output signal, the first code signal not being derived from the audio signal, transducing the output signal in acoustically reproduced form in which the encoded identification signal is imperceptible as information by a listener to produce a transduced signal, correlating the transduced signal with a second code signal corresponding to the first code signal and not derived from the audio signal to produce a correlated signal, recovering the identification signal from the correlated signal, and storing the recovered identification signal as stored data.

42. A method according to claim 41, wherein the step of modulating the first code signal comprises modulating the code signal with an identification signal including information identifying a source of an encoded broadcast, and further comprising the steps of determining an identity of an audience member within audible range of the acoustically reproduced output signal at each of a plurality of sites and transmitting the information identifying the source of the encoded broadcast and the identity of the audience member at each of the plurality of sites to a centralized data processing facility for producing an estimate of the audience for the encoded broadcast.

43. An apparatus for detecting encoded information in broadcast or recorded audio signals, comprising: means for receiving an encoded broadcast or recorded segment signal including an audio signal portion having an encoded identification signal, the encoded identification signal being produced by modulating a first code signal having a predetermined nonzero bandwidth and not derived from the audio signal portion with an identification signal having a narrower bandwidth than the predetermined nonzero bandwidth, means for correlating the audio signal portion with a second code signal corresponding to the first code signal and not derived from the audio signal portion to produce a correlated signal, and means for recovering the identification signal from the correlated signal.

44. An apparatus according to claim 43, further comprising means for synchronizing the second code signal with the encoded identification signal, and wherein the means for correlating is operative to correlate the audio signal portion with the synchronized second code signal.

45. An apparatus according to claim 43, further including means for transforming the audio signal portion to frequency domain information.

46. An apparatus according to claim 43, wherein the means for correlating comprises means for multiplying the audio signal portion with the second code signal to produce a multiplied signal and wherein the means for recovering comprises means for integrating the multiplied signal.

47. An apparatus according to claim 43, further comprising means for frequency synthesizing in accordance with code data to produce the second code signal.

48. An apparatus according to claim 47, wherein the means for correlating comprises means for mixing the audio signal portion with the second code signal.

49. An apparatus according to claim 43, further comprising means for storing the recovered identification signal as stored data.

50. An apparatus according to claim 49, comprising a plurality of devices each including the means for receiving, the means for correlating and the means for storing, each of the devices being located at a respective one of a plurality of sites, and further comprising means for sending the stored data from each of the plurality of sites to a centralized data processing facility.

51. An apparatus according to claim 43, further comprising means for recovering additional information identifying at least one of station, channel and segment identity from the received encoded broadcast or recorded segment signal.

52. An apparatus according to claim 51, further comprising means for storing the recovered identification signal with the additional information.

53. An apparatus according to claim 51, wherein the received encoded broadcast or recorded segment signal includes the additional information in the audio signal portion.

54. An apparatus according to claim 53, wherein the received encoded broadcast or recorded segment signal includes the additional information substantially in audio signal frequencies above 3000 Hz.

55. An apparatus according to claim 43, further comprising receiving means for receiving a further broadcast including encoded broadcast data produced by modulating a third code signal having a selected bandwidth with a broadcast data signal having a narrower bandwidth than the selected bandwidth; and means for correlating the further broadcast with a fourth code signal corresponding with the third code signal to recover the broadcast data signal.

56. An apparatus according to claim 43, wherein the means for receiving the audio signal portion is operative to receive the audio signal portion from a device carried on the person of an audience member.

57. An apparatus for detecting encoded information in broadcast or recorded audio signals, comprising: means for transducing an acoustically reproduced audio signal portion of an encoded broadcast or recorded segment signal to produce a transduced audio signal portion, the audio signal portion having an encoded identification signal produced by modulating a first code signal having a predetermined nonzero bandwidth and not derived from the audio signal portion with an identification signal having a narrower bandwidth than the predetermined nonzero bandwidth, the encoded identification signal being imperceptible as information in the acoustically reproduced audio signal portion, means for correlating the transduced audio signal portion with a second code signal corresponding to the first code signal and not derived from the audio signal portion to produce a correlated signal, and means for recovering the identification signal from the correlated signal.

58. An apparatus according to claim 57, further comprising means for determining an identity of an audience member within audible range of the acoustically reproduced audio signal portion.

59. An apparatus according to claim 58, wherein the means for transducing is operative to transduce an acoustically reproduced audio signal portion of an encoded broadcast wherein the audio signal portion is encoded with an identification signal including information identifying a source of the encoded broadcast, and further comprising means for transmitting the information identifying the source and information indicating the identity of the audience member to a centralized data processing facility for producing an estimate of the audience for the encoded broadcast.

60. An apparatus according to claim 58, wherein the identification signal identifies a source of the encoded broadcast or recorded segment signal.

61. An apparatus according to claim 60, further comprising means for assembling the identity of the audience member and the source of the encoded broadcast or recorded segment signal with a designation of the identity of the encoded broadcast or recorded segment signal.

62. An apparatus according to claim 58, wherein the identification signal identifies one of a source of the encoded broadcast or recorded segment signal and a designation of the identity of the encoded broadcast or recorded segment signal, and further comprising means for assembling data associating the identity of the audience member with the one of a source of the encoded broadcast or recorded segment signal and the designation of the identity of the encoded broadcast or recorded segment signal.

63. An apparatus according to claim 58, wherein the means for transducing and the means for correlating are located within a device carried on the person of the audience member.

64. An apparatus according to claim 58, wherein the means for transducing is located within a first device carried on the person of the audience member, and the means for correlating is located within a second device, and further comprising means for wirelessly transmitting the audio signal portion from the first device to the second device.

65. An apparatus according to claim 58, further comprising means for storing the recovered identification signal with a timestamp as stored data.

66. An apparatus according to claim 58, wherein the means for correlating the audio signal portion is operative to produce the correlated signal only during a predetermined audience survey time period.

67. An apparatus according to claim 66, further comprising means for limiting operation of the correlating means to the predetermined audience survey time period based on the second code signal.

68. An apparatus for determining a source or sources of at least one copyrighted work included in broadcast or recorded audio signals, comprising: means for receiving an encoded broadcast or recorded segment signal including at least one copyrighted work, the at least one copyrighted work including an audio signal portion having an encoded identification signal indicating a source of said at least one copyrighted work, the encoded identification signal being produced by modulating a first code signal having a predetermined nonzero bandwidth and not derived from the audio signal portion with an identification signal having a narrower bandwidth than the predetermined nonzero bandwidth, means for correlating the audio signal portion with a second code signal corresponding to the first code signal and not derived from the audio signal portion to produce a correlated signal, means for recovering the identification signal from the correlated signal, and means for assembling data representing the source or sources of the at least one copyrighted work.

69. An apparatus according to claim 68, further comprising means for recovering additional information identifying at least one of station, channel and identity of the at least one copyrighted work from the received encoded broadcast or recorded segment signal.

70. An apparatus according to claim 69, wherein the identification signal identifies at least one of the station and the channel of the at least one copyrighted work, and the additional information identifies at least the identity of the at least one copyrighted work.

71. An apparatus for determining a source or sources of at least one commercial advertisement in broadcast or recorded audio signals, comprising: means for receiving an encoded broadcast or recorded segment signal including at least one commercial advertisement, the at least one commercial advertisement including an audio signal portion having an encoded identification signal indicating a source of the at least one commercial advertisement, the encoded identification signal being produced by modulating a first code signal having a predetermined nonzero bandwidth and not derived from the audio signal portion with an identification signal having a narrower bandwidth than the predetermined nonzero bandwidth, means for correlating the audio signal portion with a second code signal corresponding with the first code signal and not derived from the audio signal portion to produce a correlated signal, means for recovering the identification signal from the correlated signal, and means for assembling data representing the source or sources of the at least one commercial advertisement.

72. An apparatus according to claim 71, further comprising means for recovering additional information identifying at least one of station, channel and identity of the at least one commercial advertisement from the received encoded broadcast or recorded segment signal.

73. An apparatus according to claim 72 wherein the identification signal identifies at least one of the station and the channel of the at least one commercial advertisement, and the additional information identifies at least the identity of the at least one commercial advertisement.

74. An apparatus for encoding information in audio signals to be broadcast or recorded, comprising: means for modulating a first code signal having a predetermined nonzero bandwidth and a plurality of frequency components simultaneously present therein with an identification signal having a narrower bandwidth than the predetermined nonzero bandwidth to produce an encoded identification signal having a broader bandwidth than the identification signal, and means for mixing the encoded identification signal with an audio signal to be broadcast or recorded to produce an output signal.

75. An apparatus according to claim 74, further comprising means for mixing the output signal with an additional information signal.

76. An apparatus according to claim 74, further comprising means for low pass filtering the encoded identification signal and wherein the means for mixing is operative to mix the filtered encoded identification signal with the broadcast or recorded audio signal.

77. An apparatus according to claim 74, further comprising means for inverse transforming the encoded identification signal and wherein the means for mixing is operative to mix the inverse transformed encoded identification signal with the audio signal.

78. An apparatus according to claim 74, further comprising means for frequency synthesizing according to predetermined code data to produce the first code signal.

79. An apparatus according to claim 74, wherein the modulating means is operative to modulate a code signal having a frequency spectrum matched to a frequency response characteristic of a device for acoustically reproducing the audio signal as broadcast or recorded.

80. An apparatus according to claim 74, wherein the modulating means is operative to modulate a code signal having a frequency range of approximately 300–3000 Hz.

81. An apparatus according to claim 74, in combination with means for receiving the output signal, means for correlating the received output signal with a second code signal to recover the identification signal, and means for storing the recovered identification signal as stored data.

82. An apparatus according to claim 81, further comprising a plurality of devices each including the means for receiving, the means for correlating and the means for storing, each of the devices being located at a respective one of a plurality of sites, and means for sending stored data from each of the plurality of sites to a centralized data processing facility.

83. An apparatus for encoding information in audio signals to be broadcast or recorded and detecting the encoded information therein, comprising: means for modulating a first code signal having a predetermined nonzero bandwidth with an identification signal having a narrower bandwidth than the predetermined nonzero bandwidth to produce an encoded signal, means for mixing the encoded identification signal with an audio signal to produce an output signal, the first code signal not being derived from the audio signal, means for transducing the output signal in acoustically reproduced form in which the encoded identification signal is imperceptible as information by a listener to produce a transduced signal, means for correlating the transduced signal with a second code signal corresponding to the first code signal and not derived from the audio signal to produce a correlated signal, means for recovering the identification signal from the correlated signal, and means for storing the recovered identification signal as stored data.

84. An apparatus according to claim 83, wherein the means for modulating the first code signal comprises means for modulating the first code signal with an identification signal including information identifying a source of an encoded broadcast, and further comprising means for determining an identity of an audience member within audible range of the acoustically reproduced output signal at each of a plurality of sites and means for transmitting the information identifying the source of the encoded broadcast and the identity of the audience member at each of the plurality of sites to a centralized data processing facility for producing an estimate of the audience for the encoded broadcast.

85. A method according to claim 13, wherein the further broadcast is an FM broadcast.

86. An apparatus according to claim 55, wherein the further broadcast is an FM broadcast.

87. A method according to claim 14, further comprising the step of supplying the audio signal portion to a means for converting the audio signal portion into an acoustic signal for use by the audience member.

88. An apparatus according to claim 56, further comprising means for supplying the audio signal portion to a means for converting the audio signal portion into an acoustic signal for use by the audience member.

89. A method according to claim 1, further comprising the step of sensing recording of the encoded broadcast segment signal by a recording means.

90. An apparatus according to claim 43, further comprising means for sensing recording of the encoded broadcast segment signal by a recording means.

91. A method according to claim 26, wherein the steps of receiving and correlating are performed at a plurality of sites, and further comprising the step of analyzing the recovered identification signals from the plurality of sites and the assembled data representing the source or sources of the at least one copyrighted work to detect unauthorized copying.

92. An apparatus according to claim 68, including a plurality of devices each including the means for receiving and the means for correlating, each of the devices being located at a respective one of a plurality of sites, and further comprising means for analyzing the recovered identification signals from the plurality of sites and the assembled data representing the source or sources of the at least one copyrighted work to detect unauthorized copying.

93. A method according to claim 32, wherein the step of modulating comprises modulating a television identification code signal with an identification signal for a television broadcast to produce an encoded television identification signal, and modulating a radio identification code signal different from the television identification code signal with an identification signal for a radio broadcast to produce an encoded radio identification signal, and the step of mixing comprises mixing the encoded television identification signal with a first audio signal to be broadcast as part of a television signal, and mixing the encoded radio identification signal with a second audio signal to be broadcast as part of a radio broadcast.

94. An apparatus according to claim 74, wherein the means for modulating comprises first modulating means for modulating a television identification code signal with an identification signal for a television broadcast to produce an encoded television identification signal, and second modulating means for modulating a radio identification code signal different from the television identification code signal with an identification signal for a radio broadcast to produce an encoded radio identification signal, and wherein the mixing means comprises first mixing means for mixing the encoded television identification signal with a first audio signal to be broadcast as part of a television signal, and second mixing means for mixing the encoded radio identification signal with a second audio signal to be broadcast as part of a radio broadcast.

95. A method according to claim 32, wherein the step of modulating comprises modulating the first code signal at a plurality of broadcasting locations with respective identification signals and the step of mixing comprises mixing a respective encoded identification signal with a corresponding one of a plurality of broadcast signals including at least one radio broadcast signal and at least one television broadcast signal.

96. An apparatus according to claim 74, wherein the means for modulating comprises a plurality of modulating means for each modulating the first code signal with a respective identification signal and a plurality of mixing means for each mixing a respective one of the encoded identification signals with a corresponding one of a plurality of broadcast signals including at least one radio broadcast signal and at least one television broadcast signal.

97. A method according to claim 32, wherein the step of modulating comprises modulating a geographic area code signal corresponding with a predetermined geographic area with the identification signal.

98. An apparatus according to claim 74, wherein the means for modulating is operative to modulate a geographic area code signal corresponding with a predetermined geographic area with the identification signal.

99. An encoded broadcast signal produced by: providing a broadcast signal including an audio signal, modulating a code signal having a predetermined nonzero bandwidth and a plurality of frequency components simultaneously present therein with an identification signal having a narrower bandwidth than the predetermined nonzero bandwidth to produce an encoded identification signal having a broader bandwidth than the identification signal, and mixing the encoded identification signal with the audio signal to produce the encoded broadcast signal.

100. An encoded recorded signal produced by: providing a signal to be recorded including an audio signal, modulating a code signal having a predetermined nonzero bandwidth and a plurality of frequency components simultaneously present therein with an identification signal having a narrower bandwidth than the predetermined nonzero bandwidth to produce an encoded identification signal having a broader bandwidth than the identification signal, mixing the encoded identification signal with the audio signal to produce an encoded recording signal, and recording the encoded recording signal to produce the encoded recorded signal.

101. A method of encoding information in audio signals to be broadcast or recorded, comprising the steps of:

receiving an identification signal including received identification symbols;

providing a memory means containing digital data representing groups of frequencies each corresponding to a respective one of the received identification symbols;

for each of the received identification symbols, reading digital data representing the corresponding group of frequencies from the memory means to produce an encoded signal; and mixing the encoded signal with the audio signal to be broadcast or recorded to produce an output signal.

102. A method according to claim 101, wherein each of the groups of frequencies in the memory means is represented as time domain digital data.

103. A method according to claim 101, further comprising the step of digital to analog converting the encoded signal before the step of mixing.

104. A method according to claim 101, further comprising the step of storing the groups of frequencies in the memory means at respective address ranges.

105. A method according to claim 104, wherein the memory means is located at an encoding site, and further comprising the step of downloading the digital data representing the groups of frequencies to the memory means from a master site separate from the encoding site.

106. An apparatus for encoding information in audio signals to be broadcast or recorded, comprising:

means for receiving an identification signal including received identification symbols;

memory means for storing digital data representing plural groups of frequencies, each of the plural groups of frequencies corresponding to a respective one of the received identification symbols;

means for reading from the memory means digital data representing a respective one of the plural groups of frequencies in response to each of the identification symbols to produce an encoded signal; and means for mixing the encoded signal with the audio signal to be broadcast or recorded to produce an output signal.

107. An apparatus according to claim 106, wherein each of the plural groups of frequencies in the memory means is represented as time domain digital data.

108. An apparatus according to claim 106, further comprising means for digital to analog converting the encoded signal to produce an analog encoded signal for mixing with the audio signal.

109. An apparatus according to claim 106, further comprising means for storing the plural groups of frequencies in the memory means at respective address ranges.

110. An apparatus according to claim 109, wherein the memory means is located at an encoding site, and further comprising means for downloading the digital data representing the plural groups of frequencies to the memory means from a master site separate from the encoding site.

\* \* \* \* \*